(12) United States Patent
Yamamoto

(10) Patent No.: US 7,844,120 B2
(45) Date of Patent: Nov. 30, 2010

(54) METHOD AND DEVICE FOR COMPRESSING IMAGE DATA

(75) Inventor: Toshitsugu Yamamoto, Takatsuki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1013 days.

(21) Appl. No.: 11/601,899

(22) Filed: Nov. 20, 2006

(65) Prior Publication Data

US 2007/0116367 A1 May 24, 2007

(30) Foreign Application Priority Data

Nov. 22, 2005 (JP) ............................. 2005-337825

(51) Int. Cl.
*G06K 9/36* (2006.01)

(52) U.S. Cl. ...................................... 382/232

(58) Field of Classification Search ................ 382/169, 382/232, 237, 275, 300; 358/1.9, 2.99, 3.01, 358/3.06, 3.1, 3.13, 3.14, 3.26, 3.27, 426.06, 358/426.07; 347/183–184
See application file for complete search history.

(56) References Cited

U.S. PATENT DOCUMENTS

| | | | | |
|---|---|---|---|---|
| 5,430,555 A | * | 7/1995 | Sawada et al. | ............... 382/232 |
| 6,201,614 B1 | | 3/2001 | Lin | ............................. 358/1.9 |
| 7,072,522 B2 | * | 7/2006 | Miyake et al. | ............... 382/252 |
| 7,586,649 B2 | * | 9/2009 | Yamamoto | .................. 358/3.13 |

FOREIGN PATENT DOCUMENTS

JP 6-152986 5/1994

* cited by examiner

*Primary Examiner*—Jose L Couso
(74) *Attorney, Agent, or Firm*—Sidley Austin LLP

(57) ABSTRACT

A method for compressing image data on which a pseudo gradation process has been performed by using a dither pattern is provided. The method includes the steps of dividing the image data into predetermined blocks, calculating a typical value if an arrangement pattern of image data in each block can be reproduced by using a dither pattern that was used for the pseudo gradation process and the typical value, checking whether there is an arrangement pattern that matches the arrangement pattern of the image data in the block before then if it cannot be reproduced, calculating position data indicating a matching position if there is the arrangement pattern before then, obtaining the arrangement pattern of the image data in the block as block data if there is not the arrangement pattern before then, and using the calculated or obtained typical value, position data or block data for generating compressed data.

21 Claims, 37 Drawing Sheets

FIG. 11

TJK

| POSITION | DOT PATTERN | MINIMUM VALUE OF UPPER LIMIT VALUE | MAXIMUM VALUE OF LOWER LIMIT VALUE |
|---|---|---|---|
| (0, 0) | 0 | 255 | 175 |
| (0, 0) | 1 | 1 | 175 |
| (0, 0) | 2 | 1 | 175 |
| ⋮ | ⋮ | ⋮ | ⋮ |
| (0, 0) | 254 | 1 | 2 |
| (0, 0) | 255 | 1 | 0 |
| (0, 1) | 0 | 255 | 155 |
| ⋮ | ⋮ | ⋮ | ⋮ |
| (0, 1) | 255 | 1 | 0 |
| (0, 2) | 0 | 255 | 141 |
| ⋮ | ⋮ | ⋮ | ⋮ |
| (34, 17) | 255 | 0 | 0 |

THE NUMBER OF CODES = 26
Root = 24

| Root | CHILD 0 | CHILD 1 |
|---|---|---|
| 0 | -12 | -16 |
| 1 | -10 | -15 |
| 2 | -21 | -11 |
| 3 | -17 | -6 |
| 4 | -4 | -23 |
| 5 | -18 | -22 |
| 6 | 0 | -24 |
| 7 | -3 | -20 |
| 8 | -14 | -9 |
| 9 | 1 | -5 |
| 10 | -19 | -8 |
| 11 | 3 | 2 |
| 12 | -7 | -13 |
| 13 | 5 | 4 |
| 14 | -25 | 6 |
| 15 | 8 | 7 |
| 16 | 10 | 9 |
| 17 | 11 | -2 |
| 18 | 13 | 12 |
| 19 | 15 | 14 |
| 20 | 17 | 16 |
| 21 | 19 | 18 |
| 22 | 21 | 20 |
| 23 | -1 | 22 |
| 24 | 23 | -26 |

「011011」

① STARTING FROM ROOT=24
②
③
④
⑤

| TL1 | TL2 | TL3 | TL4 | TL5 |
|---|---|---|---|---|
| 108, 108, 108 | 108, 108, 108 | 112, 115, 116 | 115, 0, 0 | 2, 0, 0 |
| <0> | <0> | <0> | <0> | <1> |
| <0> | <0> | <1> | <1> | <0> |
| <000> | <000> | <111> | <101> | <000> |
| <0> | <0> | <0> | <0> | <0> |

METHOD AND DEVICE FOR COMPRESSING IMAGE DATA

This application is based on Japanese patent application No. 2005-337825 filed on Nov. 22, 2005, the contents of which are hereby incorporated by reference.

BACKGROUND OF THE INVENTION

1. Field of the Invention

The present invention relates to a method and a device for compressing image data. In particular, it relates to a method and a device for compressing image data that are obtained by a pseudo gradation process using a dither pattern.

2. Description of the Prior Art

In general, a print system including a computer and a printer is used. As such a print system, there is a type in which a computer side performs an image processing such as a pseudo gradation process on image data to be printed so that a printer side does not need to perform a special process on the image data received from the computer and prints the image on a paper sheet just by using the image data.

Conventionally, a raster printer is known as a printer that is used for this type. A raster printer does not perform any special image processing on the printer side, so it can be realized at a low cost by using a small scale of hardware. However, on the contrary, it has a disadvantage that quantity of data to be transmitted increase because image data that can be printed as they are on a paper sheet are transmitted. In addition, if the image data contain character data, it is necessary to increase resolution for printing characters sharply. As a result, quantity of data to be transmitted to the printer is further increased. For this reason, it takes much time to transmit image data from the computer to the printer.

In order to solve this problem, the computer side should compress the image data. However, if the process for compressing is complicated, the compressing process itself needs a lot of time. Furthermore, the printer side also needs a lot of time for expansion process, and a scale of hardware for the expansion process increases causing a high cost.

Therefore, in order to enable use of an inexpensive printer and to realize a print system that is capable of performing a high speed process as a whole, a compression technique is desired that can perform a compression process with a light load and the expansion process by a small scale of hardware and can realize a high compression ratio.

In order to print image data having multi gradation levels by a printer, it is necessary in many cases to perform the pseudo gradation process on the image data. As a method for the pseudo gradation process, a dithering method is known well conventionally. In the dithering method, a dither pattern is used for comparing threshold values of the dither pattern with values of pixels of the image data so as to generate binary data.

As a compression technique noting the dither pattern, there is a method disclosed in Japanese unexamined patent publication No. 6-152986. According to the method disclosed in this document, the binary image data are divided into blocks having a predetermined size. A reference pattern corresponding to the number of dots contained in an arbitrary image block is compared with the image block. If the image block matches the reference pattern, a code indicating the reference pattern is assigned. Otherwise, a result of the comparison is encoded.

In addition, as a compression technique for binary image data, JBIG method is known that is adopted by ITU (International Telecommunication Union)-T recommendation.

In addition, U.S. Pat. No. 6,201,614 discloses a method of compressing image data on which the pseudo gradation process was performed by using a dither pattern. According to the method disclosed in this document, a pixel value of each pixel is compared with a threshold value so that a range is determined for each pixel.

However, according to the method disclosed in the above-mentioned Japanese unexamined patent publication No. 6-152986, the reference pattern is encoded when a designated image block matches the reference pattern. Therefore, quantity of data to be transmitted may increase due to the code of the reference pattern.

In contrast, the JBIG method has relatively light load of the compressing process, so the compressing process can be performed at a high speed even on a computer. However, the JBIG method has a compression ratio that is not so large as other methods such as the LZS method or the LZW method. In particular, if halftone data increase, the compression ratio will be decreased.

In addition, a value is determined for each pixel in the method disclosed in the above-mentioned U.S. Pat. No. 6,201,614, so quantity of information is not decreased only by itself. Therefore, it is necessary to use other means for compressing the data in order to reduce the quantity of information.

As to these issues, the applicant proposed formerly a method and a device for compressing image data on which the pseudo gradation process was performed by using a dither pattern, at a high speed with a high compression ratio, and the compressed data can be reconstructed by using a small scale of hardware.

SUMMARY OF THE INVENTION

An object of the present invention is to improve the compression method and device proposed formerly so as to enable a higher speed and a higher compression ratio for compressing image data.

A method according to one aspect of the present invention is a method for compressing image data. The method includes the steps of dividing the image data into predetermined blocks, calculating a typical value about density in each block if the image data in the block can be reproduced by using the typical value, checking whether or not there is an arrangement pattern that matches an arrangement pattern of the image data in the block before the block if the image data in the block cannot be reproduced, calculating position data indicating a matching position if there is the arrangement pattern before the block, while obtaining the arrangement pattern of the image data in the block as block data if there is not the arrangement pattern before the block, and creating compressed data by using the calculated or obtained typical value, position data or block data.

In addition, image data on which a pseudo gradation process has been performed by using a dither pattern are compressed. In this case, a typical value is calculated if an arrangement pattern of the image data in each block can be reproduced by using the dither pattern that was used for the pseudo gradation process and the typical value.

The step for calculating a typical value includes, for a noted block that is one area in the blocks, determining a typical value such that the image data in the noted block is reproduced when density of each pixel in the noted block is determined by interpolation with a predetermined interpolation rule by using the typical value of the noted block and typical values of one or more blocks neighboring the noted block and further a pseudo gradation process on the density is performed by using the dither pattern.

Preferably, the block is obtained by dividing the image data in a line direction and in a subscan direction that is perpendicular to the line direction, and the block covers a plurality of lines. If there is information about density to be replaced with the typical value or to be added to the typical value, it is determined as additional information for each line in each of the blocks or for a plurality of lines that is fewer than lines of the block, and the additional information is also used for generating the compressed data.

According to the present invention, it is possible to perform a compression process at higher speed and with higher compression ratio than the compression method and device that were proposed before.

BRIEF DESCRIPTION OF THE DRAWINGS

FIG. 11 is a diagram showing an example of an upper and lower limit table.
FIG. 22 is a diagram showing an example of a decode table.
FIG. 25 is a diagram showing an example of pseudo gradation image data.
FIG. 28 is a diagram showing contents of the working memory that stores compressed data.

DESCRIPTION OF THE PREFERRED EMBODIMENTS

The invention will now be described in detail with reference to the attached drawings.

First Embodiment

General Structure of System

Figure 1:
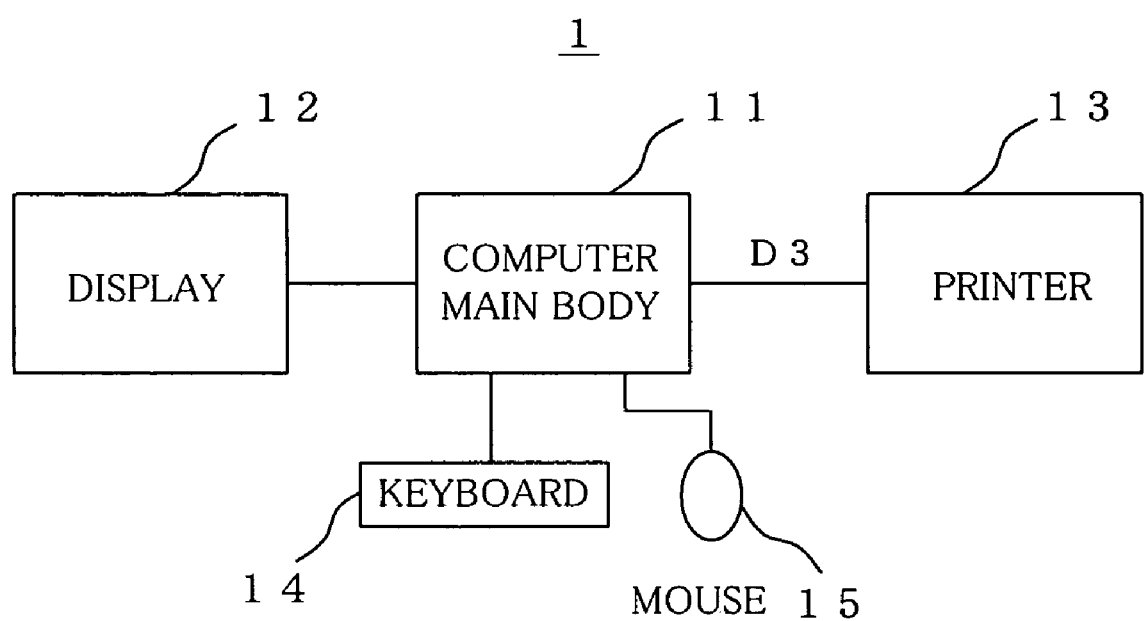
FIG. 1 is a diagram showing a general structure of a print system according to an embodiment of the present invention.
Figure 2:
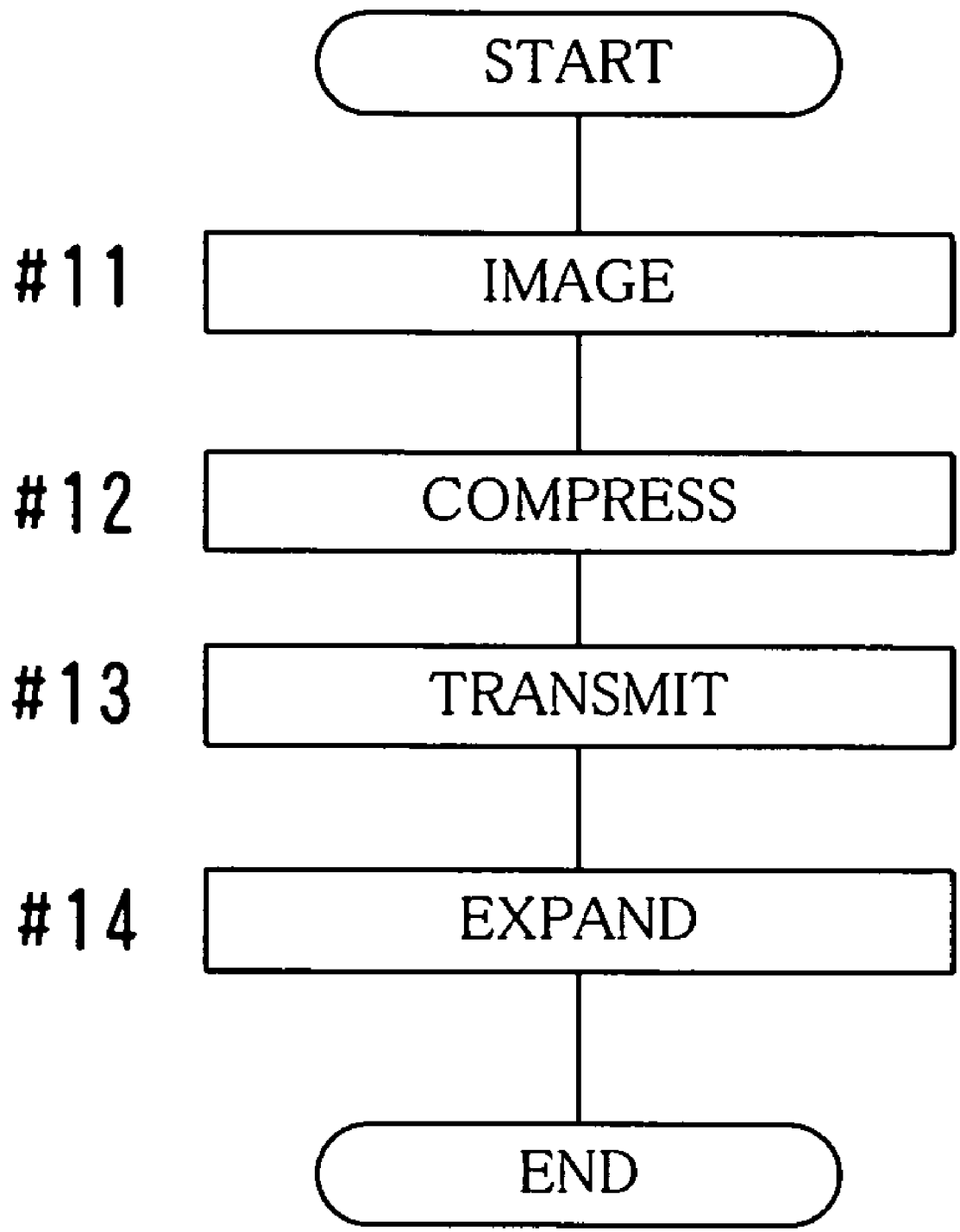
FIG. 2 is a flowchart showing a general flow of image data.

FIG. 1 is a diagram showing a general structure of a print system 1 to which the compression method of image data is applied according to an embodiment of the present invention, FIG. 2 is a flowchart showing a general flow of image data in the print system 1.

In the following description, "image data", "gradation image data", "pseudo gradation image data" and the like may be referred to as "image", "gradation image", "pseudo gradation image" and the like by omitting "data".

In FIG. 1, the print system 1 is made up of a computer main body 11, a display 12, a printer 13, a keyboard 14, a mouse 15 and the like.

The computer main body 11 compresses image data inputted externally or image data (original image data) created internally and transmits them to the printer 13.

In this embodiment, the image data FD are binary or multivalued pseudo gradation image data. If the image data FD are not pseudo gradation image data such as gradation image data having 256 steps of gradation for each of RGB or CMY colors, a pseudo gradation process is performed on the data by a dithering method using a dither pattern, which will be described later.

The printer 13 is a laser printer equipped with an electrophotographic print engine in this embodiment. More specifically, a laser beam emitted by a laser diode is deflected by a polygon mirror or the like, so that the laser beam scans a surface of a photoconductor drum or the like for forming an electrostatic latent image. The laser beam from the laser diode is modulated with intensity. The intensity modulation is performed by using reconstructed image data. More specifically, image data obtained by reconstructing the compressed data are read out from the buffer memory in which the image data are recorded, in the order of pixels in synchronization with the scanning of the photoconductor drum by the laser beam. The read image data are outputted as intensity data to a laser drive portion that is a driving circuit of the laser diode.

As shown in FIG. 2, the target image data FD (#11) are compressed so that compressed data are created (#12) in the computer main body 11. Then, the compressed data are transmitted to the printer 13 (#13). In the printer 13, the compressed data are expanded for printing on a paper sheet or the like (#14).

If the image data FD are gradation image data, a pseudo gradation process may be performed prior to the compression process as described above. In other words, the image data FD after the pseudo gradation process are prepared in the step #11.

Note that a personal computer, a workstation and other various computers can be used as the computer main body 11. A raster printer, a GDI printer and other various printers can be used as the printer 13.

Figure 3:
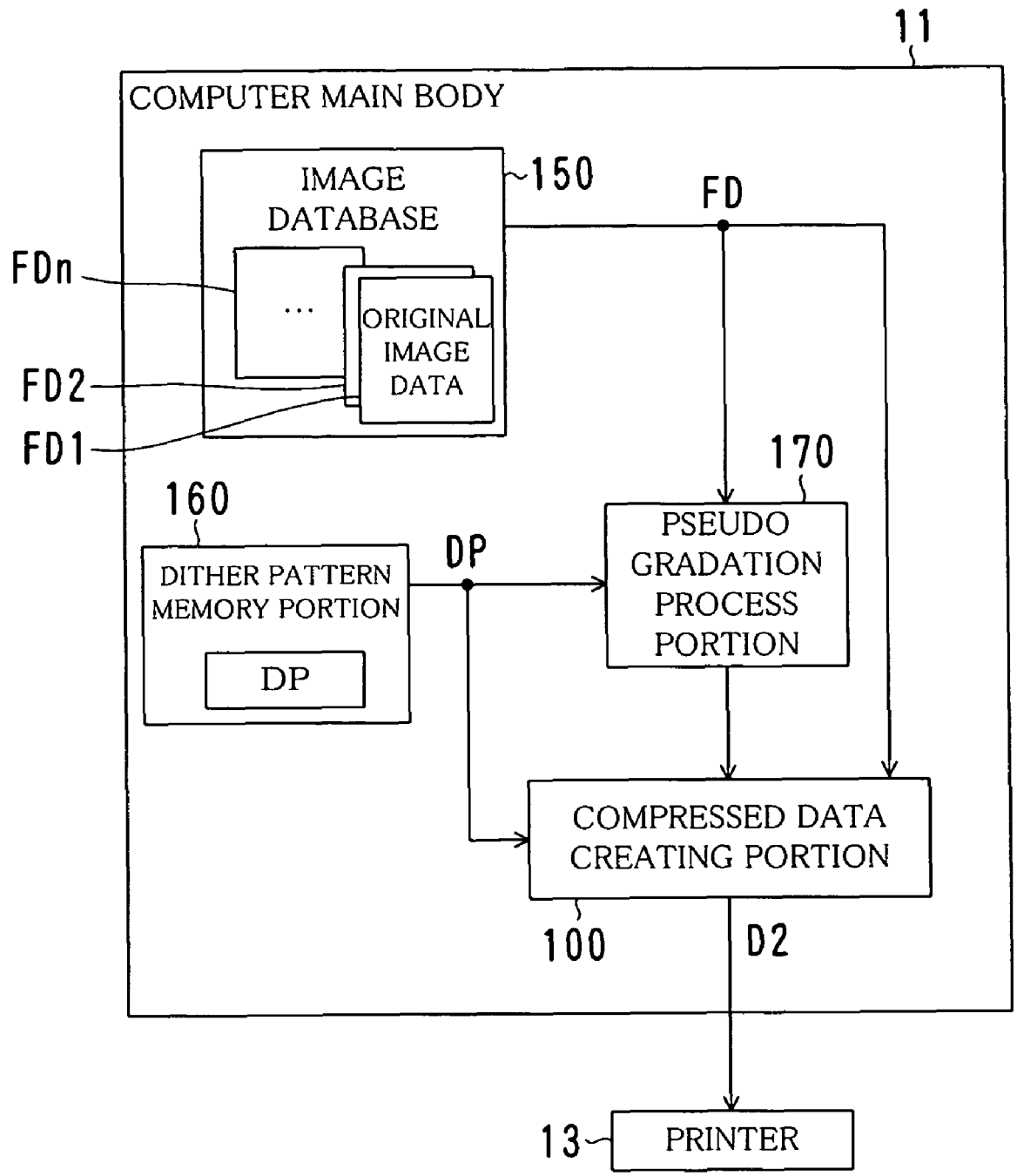
FIG. 3 is a block diagram showing a structural function of a computer main body.
Figure 4:
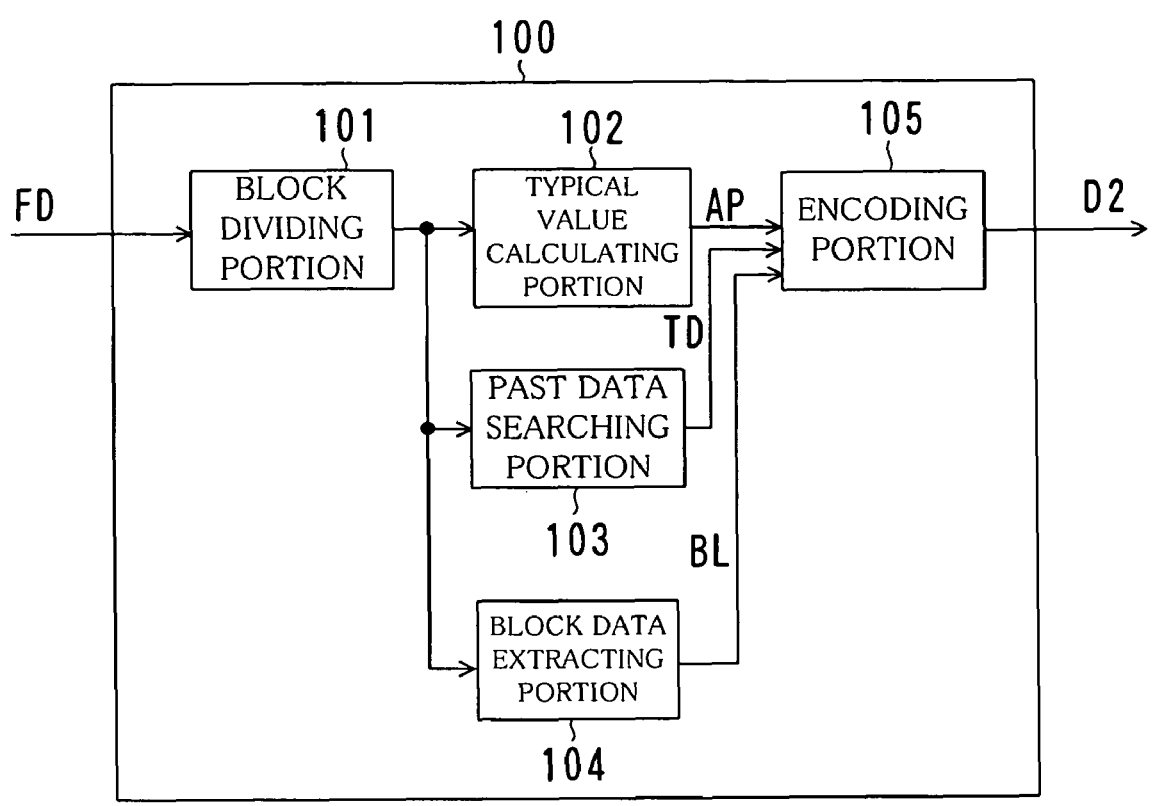
FIG. 4 is a block diagram showing an example of a structural function of a compressed data creating portion.
Figure 5:
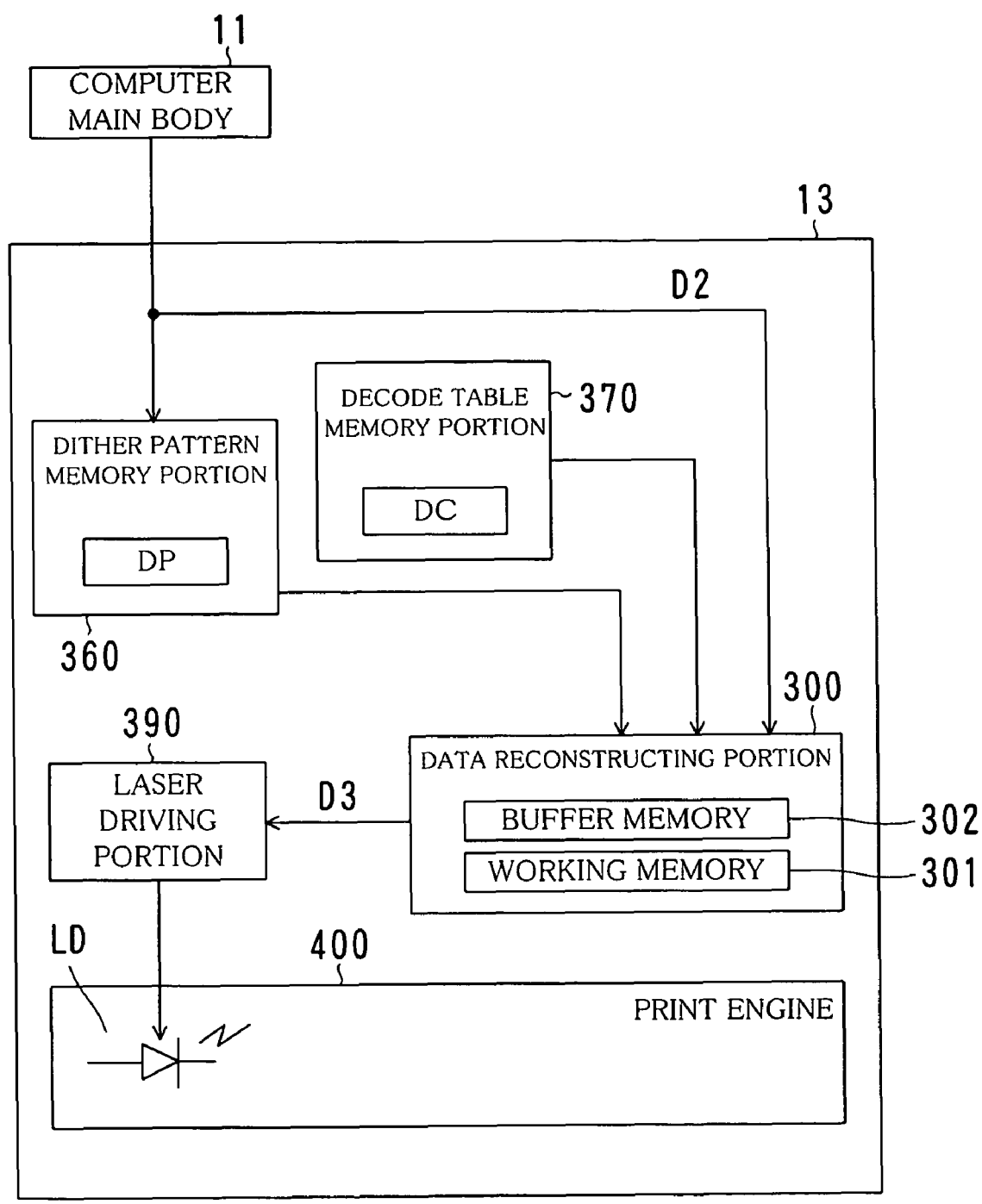
FIG. 5 is a block diagram showing a structural function of a printer.

FIG. 3 is a block diagram showing a structural function of the computer main body 11, FIG. 4 is a block diagram showing an example of a structural function of a compressed data creating portion 100, and FIG. 5 is a block diagram showing a structural function of the printer 13.

In FIG. 3, the computer main body 11 is made up of an image database 150, a dither pattern memory portion 160, a pseudo gradation process portion 170, a compressed data creating portion 100 and the like.

The image database 150 keeps many image data (original image data) FD1, FD2, ... FDn. A whole or a part of the image data FD1-FDn may be referred to as "image data FD". Most of the image data FD are a color image, and in this case, one piece of image data FD is made up of image data of C (cyan), M (magenta), Y (yellow) and K (black) colors. The image data FD are inputted from a scanner, a digital camera or other external devices or are created inside. In some cases, it is obtained when the pseudo gradation process is performed on it.

The dither pattern memory portion 160 keeps a plurality of types of the dither patterns DP. Each of the dither patterns DP includes one for character area, another for an image area and another for a chart area concerning each of C, M, Y and K colors.

The pseudo gradation process portion 170 converts the image data FD into binary or multivalued pseudo gradation image data by using the dither pattern DP, if necessary. The image data after the pseudo gradation process may be referred to as "image data FDh" or "pseudo gradation image data FDh". The pseudo gradation process may also be called a halftone process. The image after the pseudo gradation process is referred to as a pseudo gradation image, a halftone image or the like. As the pseudo gradation process, a process of converting into multi values such as two values or four values is performed.

The compressed data creating portion 100 performs the compression process so as to create compressed data D2. More specifically, as shown in FIG. 4, the compressed data creating portion 100 is provided with a block dividing portion 101, a typical value calculating portion 102, a past data searching portion 103, a block data extracting portion 104, an encoding portion 105 and the like.

The block dividing portion 101 divides the image data FD into a plurality of blocks. If a typical value that will be described later cannot be calculated, the block may further be divided into a plurality of small blocks.

The typical value calculating portion 102 calculates a typical value AP about density in each block if the image data of the block can be reproduced by using the typical value AP. In this embodiment, the typical value AP is calculated if an arrangement pattern of the image data in each block can be reproduced by using the typical value and the dither pattern DP that was used in the pseudo gradation process.

The past data searching portion 103 checks whether or not there is an arrangement pattern that matches the arrangement pattern of the image data of the block before the block. If there is the arrangement pattern before the block, position data TD indicating the matching position are calculated.

The block data extracting portion 104 extracts and obtains an arrangement pattern of image data of the block as block data BL.

The encoding portion 105 encodes data containing the typical value AP, the position data TD or the block data BL so as to create the compressed data D2. The encoding portion 105 stores a decode table that is necessary for an encoding process. The decode table may be transmitted to the printer 13 in advance. In addition, an interpolation rule or the like for determining a density value of each pixel in each block by interpolation may be transmitted to the printer 13 in advance, if necessary.

Although it is possible to encode the typical value AP itself for example in the encoding process, instead it is possible to determine differential information of typical values AP between neighboring blocks so as to encode the determined differential information, for example. Thus, a compression ratio can be improved.

In FIG. 5, the printer 13 is made up of a dither pattern memory portion 360, a data reconstructing portion 300, a decode table memory portion 370, a laser driving portion 390, a print engine 400 and the like.

The dither pattern memory portion 360 keeps data similar to the dither pattern DP stored in the dither pattern memory portion 160 of the computer main body 11. The dither pattern DP may be transmitted from the computer main body 11 in advance, or the same dither pattern DP may be stored in an appropriate memory, which is built in the printer 13 in advance.

The decode table memory portion 370 stores a decode table DC that is transmitted from the computer main body 11.

The data reconstructing portion 300 receives the compressed data D2 from the computer main body 11 and reconstructs the received compressed data D2, so as to reproduce a dot pattern that is the same as the original image data FD or the pseudo gradation image data FDh. For a reconstruction process, a working memory 301, a buffer memory 302 and the like are provided. When the reconstruction process is performed, the dither pattern DP, the decode table DC or the like is referred to, if necessary. Note that the data reconstructing portion 300 is provided with a procedure and a rule for performing the reconstruction process corresponding to the compressing process performed by the compressed data creating portion 100 as a program for executing the process or a hardware process circuit.

The laser driving portion 390 modulates intensity of light emitted from the laser diode LD based on the image data read out from the buffer memory 302. The print engine 400 performs the printing process on a paper sheet by the electrophotographic process as described above.

Next, the compressing process in the step #12 will be described.

Figure 6:
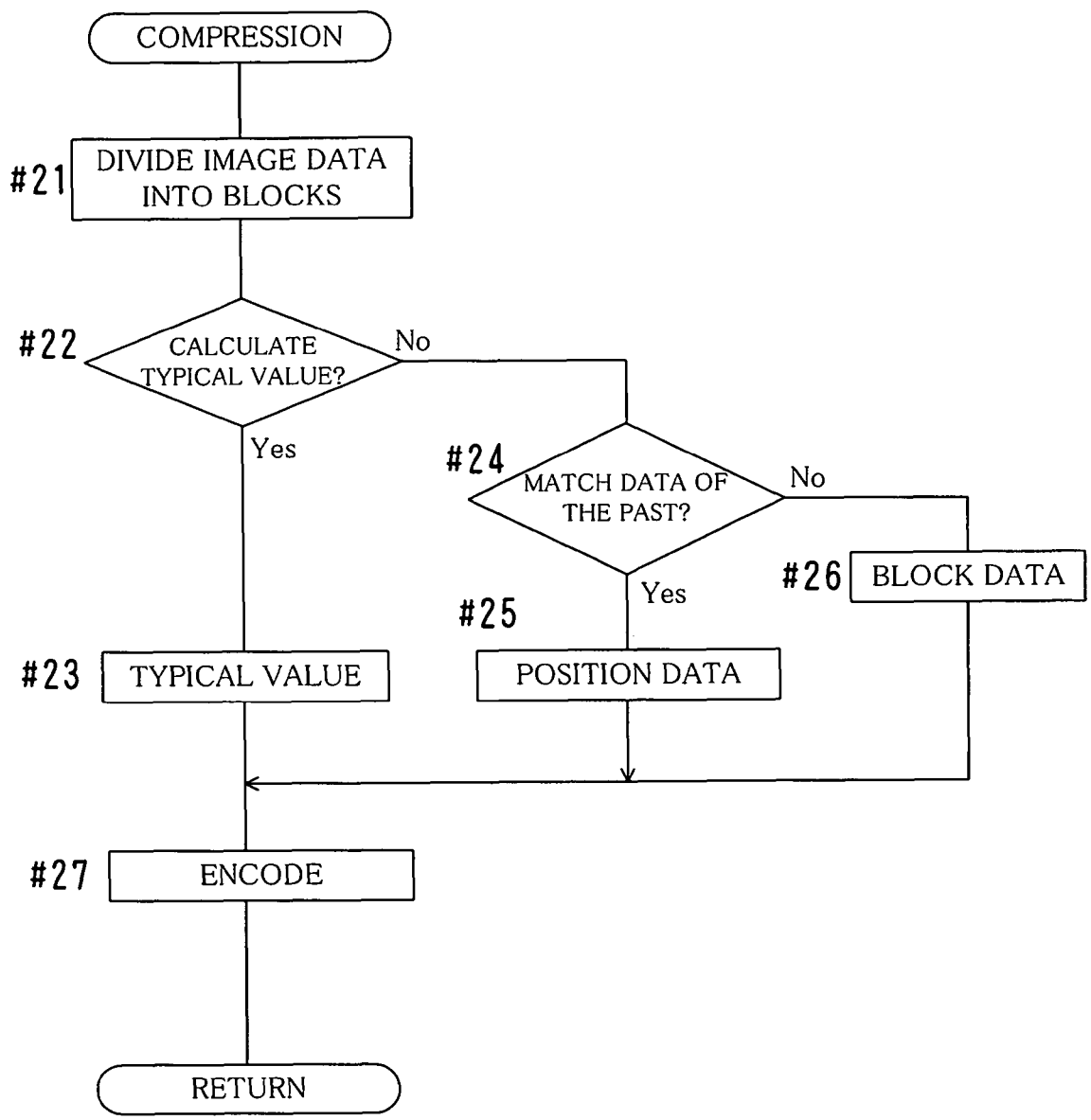
FIG. 6 is a flowchart showing a general flow of a compressing process.
Figure 7:
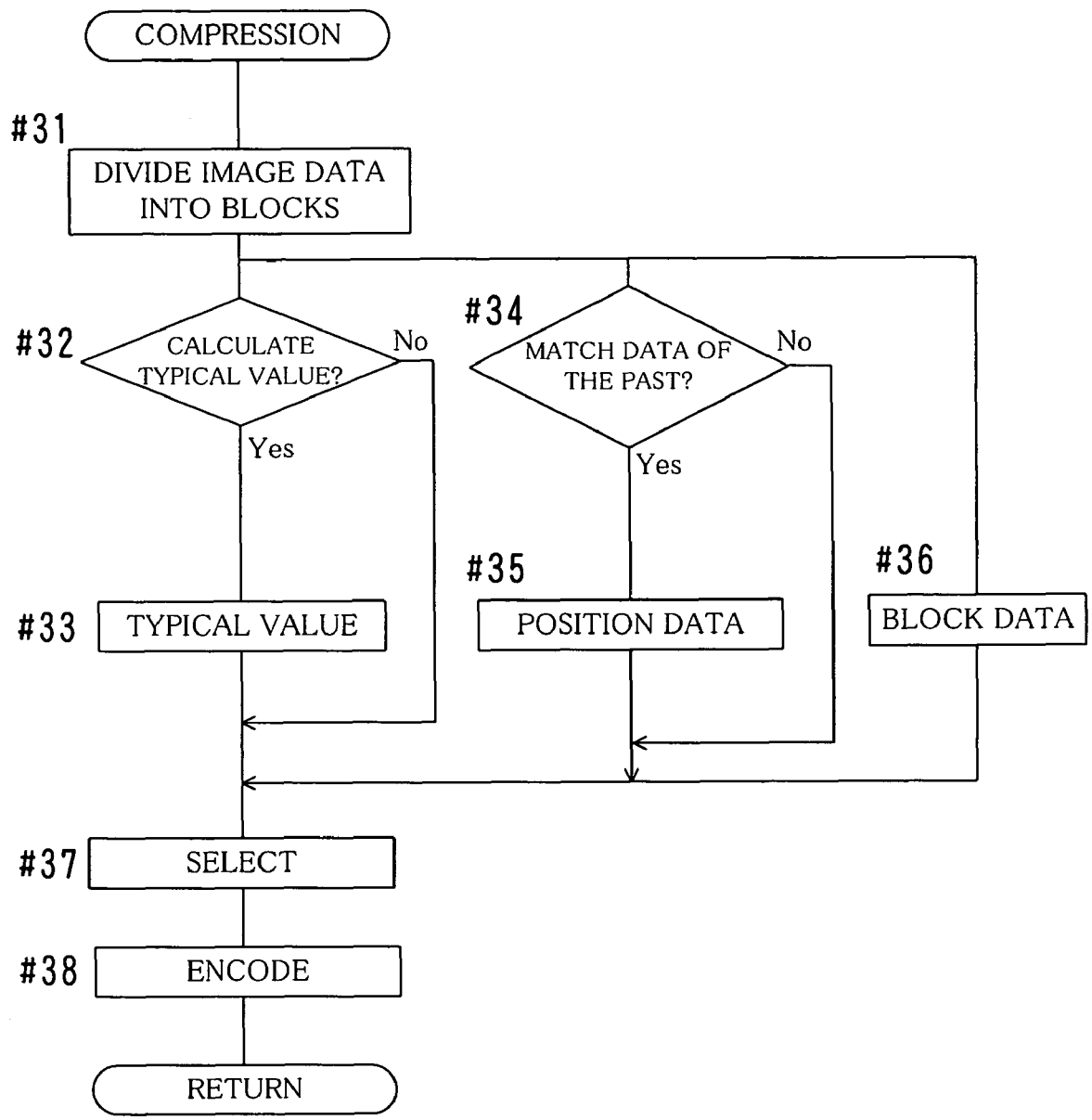
FIG. 7 is a flowchart showing a general flow of another example of the compressing process.

FIG. 6 is a flowchart showing a general flow of the compressing process, and FIG. 7 is a flowchart showing a general flow of another example of the compressing process.

In FIG. 6, the image data FD are divided into blocks first (#21). More specifically, the image data FD are divided into blocks in the line direction that is a main scan direction and in a subscan direction, so that many blocks arranged in a matrix are defined. Each of the blocks has a size covering a plurality of lines in the main scan direction. Note that it is not always necessary to divide all the image data FD in advance when it is divided into blocks. For example, the image data of a block to be processed may be cut out at the time point of the process. In other words, the division may be virtual one.

Then, a typical value AP about density in each block is calculated (#22). If the typical value AP is calculated (Yes in #22), it is stored (#23). This "typical value AP" is a parameter (an area parameter) representing density values in each block. By using the typical value AP, a density value of each pixel in the block can be reproduced with considerable accuracy. As a method for determining the typical value AP, various methods can be used, which will be described later.

If the typical value AP is not calculated (No in #22), it is checked whether or not there is an arrangement pattern matching the arrangement pattern of the image data FD in the block before it (#24). If there is the arrangement pattern before it (Yes in #24), position data TD indicating the matching position is calculated and is stored (#25).

If there is no arrangement pattern matching the arrangement pattern of the image data FD in the block before it (No in #24), the arrangement pattern of the image data FD in the block is obtained as the block data BL (#26).

One of the calculated or obtained typical value AP, the position data TD and the block data BL is used for generating the compressed data (#27). In this case, it is possible to use the differential information for generating the compressed data concerning the typical value AP as described above.

In FIG. 7, the image data FD are divided into blocks (#31). In each block, calculation of the typical value AP (#32), and checking whether or not there is an arrangement pattern matching the arrangement pattern of the image data FD before it (#34) are performed in parallel. Then, if the typical value AP or the position data TD is obtained, it is stored (#33 and #35). One of the obtained typical value AP, the position data TD and the block data BL is selected (#37), and the selected data is used for generating the compressed data (#38).

In the selection in the step #37, one having less quantity of data is selected, for example. Usually, the typical value AP is selected because it has less quantity of data. Alternatively, it is possible to select one that was obtained early on the time base. For example, if the position data TD was obtained early because there is the matching arrangement pattern at a position close to the block, the position data TD is selected.

In this way, the parallel processing is more effective when the typical value AP or the position data TD is calculated by a hardware circuit. If the calculation is performed by a hardware circuit, the process is performed very fast without heavy load on the system. Therefore, efficiency is improved as a whole.

In this way, if the typical value AP cannot be calculated, the position data TD are calculated instead. Alternatively, calculation of the typical value AP and calculation of the position data TD are performed in parallel for the selection. Thus, the image data FD can be compressed faster at high compression ratio.

Hereinafter, it will be described more in detail.

[Division into Blocks]

Figure 8:
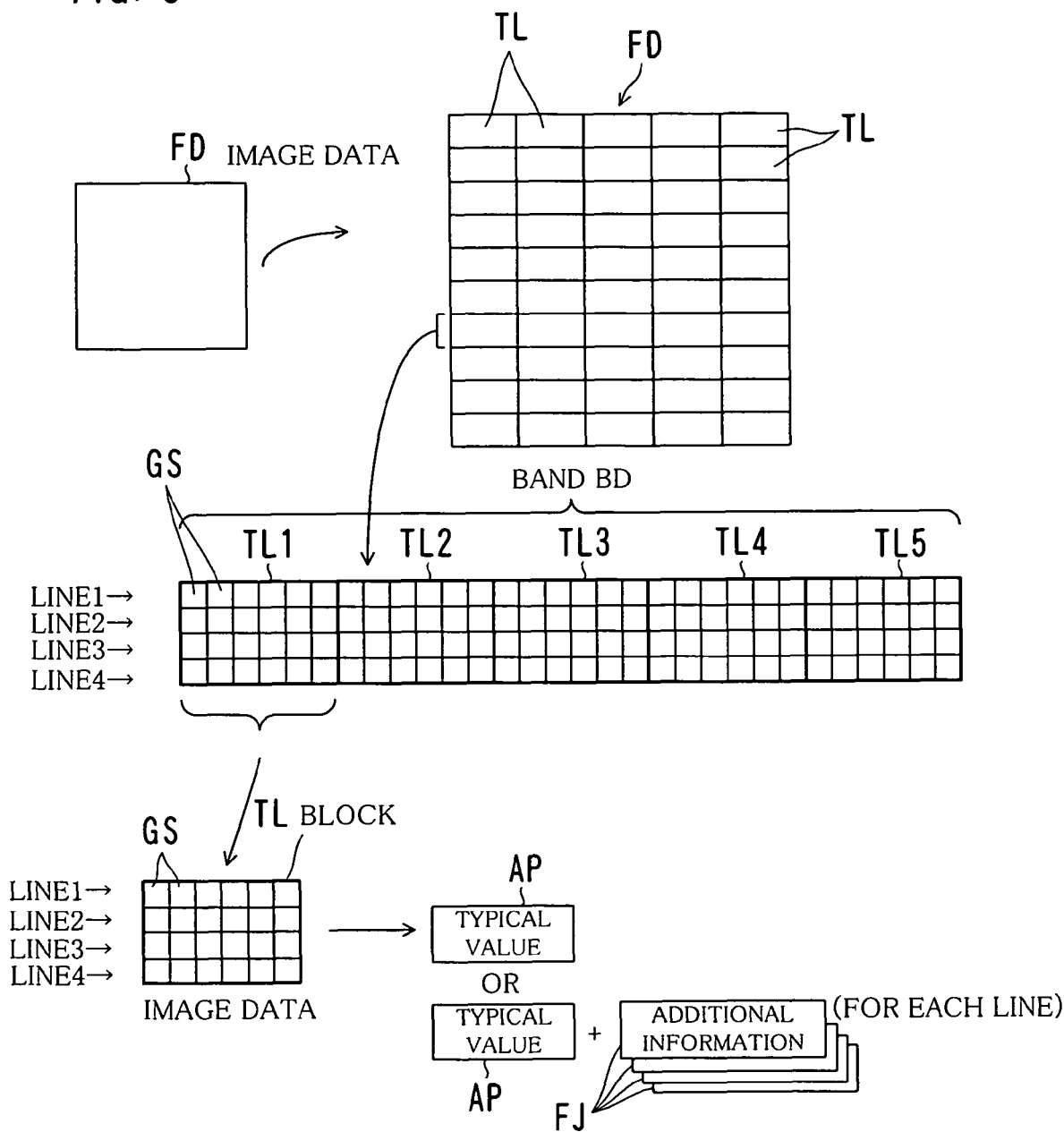
FIG. 8 is a diagram showing an example of a method for dividing image data into blocks.

FIG. 8 is a diagram showing an example of a method for dividing image data FD into blocks.

In FIG. 8, an example of one page of image data FD is shown. This image data FD are divided into many blocks TL arranged in a matrix. In the example shown in FIG. 8, the image data FD are divided into five blocks TL in the line direction. The whole area of the five blocks TL1-TL5 arranged on the lines is referred to as a "band BD". One block TL is made of an area of four pixels in the vertical direction and six pixels in the horizontal direction. In other words, each of the blocks TL has a size corresponding to four lines in the subscan direction.

Note that a size of the block TL can be changed variously. One block TL may be a rectangular area including 96 (6×16) pixels or 48 (6×8) pixels, for example.

Each of the blocks TL may be divided further into plurality of small blocks. In this case, the division is performed so that the number of lines of each small block becomes the same as the number of lines of the blocks TL. In other words, the block is divided in the line direction. When it is divided into small blocks, the typical value is determined for each small block, and additional information is determined for each line in the small block.

[Calculation of Typical Value]

The typical value AP is calculated for each of the divided blocks TL. More specifically, the whole of the density values of pixels GS included in one block TL is represented by one typical value AP.

In addition, it is possible to represent the whole of the density values of the pixels GS included in one block TL by one typical value AP and the additional information FJ of each line. In this way, when the additional information FJ of each line is used, the reconstruction in the expansion process performed by the printer 13 can be performed by the line, so that one line of the buffer memory 302 is sufficient for the expansion process. Therefore, a memory capacity can be reduced. Thus, the memory can be embedded in an ASIC or the like easily, so that fast and low cost image expansion can be realized.

There are various methods for determining the typical value AP including the following examples:

(1) If the image data FD is pseudo gradation image data FDh that was obtained by the pseudo gradation process using the dither pattern, a value, which is selected from specific density values such that a pseudo gradation image obtained by performing the pseudo gradation process on a specific density value using the dither pattern that was used for the pseudo gradation process matches the image data of the block TL, is used as the typical value. In other words, in this case, for example, a value between the minimum value K of the threshold value in the case where the threshold value of the dither pattern is larger than the density value of the image data FD and the maximum value J of the threshold value in the case where the threshold value of dither pattern DP is smaller than the density value of the image data FD is used as the typical value.

(2) A density value of a specific pixel in the block TL is used as the typical value.

(3) An intermediate value of density values of a plurality of pixels or all pixels in the block TL is used as the typical value. In this case, as the intermediate value, an average value, a weighted average value, a mean-square value or the like may be used. Alternatively, the average value or the like may be determined for values except for singular points.

(4) An intermediate value of density values of a specific pixel and its surrounding pixels in the block TL is used as the typical value.

(5) A parameter for expressing image data in the block TL by using a function is used as the typical value. For example, an argument of a function for approximating the original image data FD like a spline interpolation is used.

(6) As to the typical value that is once determined, it is checked whether or not the image data can be reproduced appropriately by using the typical value. If it is decided that it is reproduced appropriately, it is used as a real typical value. For example, with respect to a typical value of the pseudo gradation image data FDh, reproducibility is determined by the following procedure. One block TL is regarded as a noted block, an appropriate interpolation rule is applied to a typical value of the noted block or typical values of the noted block and one or more blocks TL neighboring the noted block, and a density value of each pixel included in the noted block is determined by the interpolation. The pseudo gradation process is performed on a density value of each of the determined pixels by using the dither pattern that was used for the pseudo gradation process, and it is determined whether or not the pseudo gradation image obtained by this process is reproduced within a predetermined error range with respect to the original pseudo gradation image data FDh. If it is reproduced within the predetermined error range, it is determined that the reproducibility is good, and the typical value of the noted block is used as the real typical value. In this case, with respect to the block TL that was regarded as the noted block first, there is no neighboring block whose typical value is already determined. Therefore, the typical value may be determined by considering density values or the like of pixels locating at peripheral portions or edge portions, particularly on apex portions in the noted block.

In addition, there are various methods for determining the additional information FJ including the following examples:

(1) A difference between a typical value and a density value of a specific pixel on each line in the block TL is used as the additional information.

(2) A difference between a typical value and an intermediate value of density values of pixels on each line in the block TL is used as the additional information. As the intermediate value, an average value, a weighted average value, a mean-square value or the like may be used. In addition, the average value or the like may be determined for values except for singular points. In addition, it is preferable to use the same method for calculating the intermediate value between the typical value and the additional information.

(3) In the case where a parameter for expressing image data in the block TL by using a function is used as the typical value, a difference between the density value of the pixel on each line in the block TL and the image data expressed by the function is used as the additional information.

(4) It is determined whether or not the image data on each line in the block TL is reproduced appropriately by using the typical value. If it is not reproduced appropriately, other data, for example image data FD on the line themselves are used as the additional information. Alternatively, appropriate information for correcting so that it is reproduced appropriately is used as the additional information.

[Calculation of Position Data TD]

Next, the method of determining the position data TD will be described.

Figure 9:
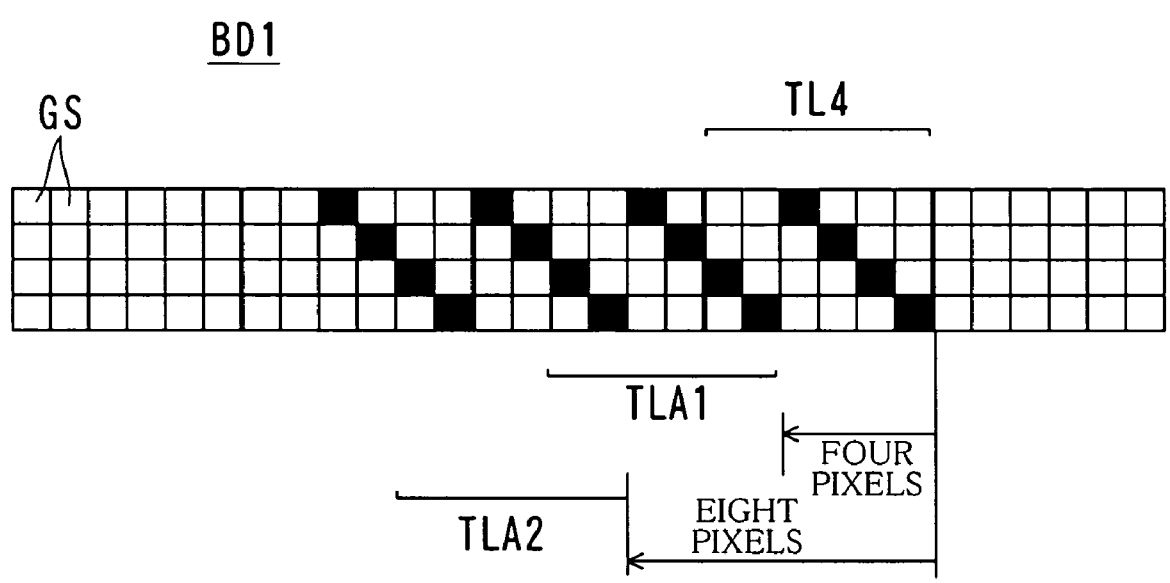
FIG. 9 is a diagram for explaining a method of determining position data.

FIG. 9 is a diagram for explaining a method of determining position data TD.

In FIG. 9, it is supposed that the position data TD of the block TL4 included in the band BD1 is determined. It is checked whether or not there is an arrangement pattern matching the arrangement pattern of the image data FD of the block TL4 before it. Then, there is the same arrangement pattern at the position four pixels before the block TL, i.e., the part TLA1 that is four pixels left in FIG. 9. Therefore, in this case, the position data TD can be calculated, and the value thereof is "4 pixels" or "4".

In addition, if one pixel has 16 values, i.e., 16 gradation levels for example, one pixel is made up of four bits. Since, two pixels are made up of one byte, a value of the position data TD can be expressed in "2 bytes" or "2".

In this way, it is flexible how to define a value of the position data TD, and it is sufficient to calculate a value of the position data TD in accordance with the determined definition (rule).

Note that in FIG. 9 there is the same arrangement pattern in the part TLA2 that is 8 pixels left with respect to the block TL4. Therefore, in this case, it is also possible that the position data TD are "8 pixels" or "8". However, the position data TD at a position that is closest to the block TL is usually used.

In addition, with respect to the block TL4 shown in FIG. 9, in the case where the position data TD are "4 pixels", the arrangement pattern of the block TL4 is expanded from the position data TD by expanding sequentially from the left pixel GS in the block TL4, for example.

In addition, the check whether or not there is a matching arrangement pattern may be performed while shifting by one pixel or by two pixels. In addition, it is possible to shift by block. However, if one pixel has 16 gradation levels as described above for example, it is convenient to shift by two pixels because the process is performed by byte.

In addition, concerning how long it should go back for the checking, it may go back to the first of the image data FD. However, it is preferable for good efficiency of the process to perform the checking process within the range in which the image data FD are stored in the working memory. For example, it is preferable to go back for the checking process within the band BD in which the block TL is included. In addition, if the range of the position data TD is a range that can be expressed by one byte, the range is "1" through "255" in expression of the number of pixels or bytes.

Then, if there is no matching arrangement pattern found in the range that was checked, it is decided that the position data TD cannot be calculated. In this case, it is tried to calculate the typical value AP or the position data TD by using the block data BL of the block TL or by further dividing the block TL into small blocks.

In this way, if the position data TD are determined and are used for generating the compressed data D2, the compression ratio is improved. In particular, if the image data FD are characters or drawings, black color patterns or white color patterns may appear frequently. Therefore, the position data TD are determined at a close position in many cases, so the compression ratio is increased.

In various image processing software, there is an application program that supports realizing a translucent drawing in a drawing system that cannot set transparency by outputting alternately image data of a translucent object and image data of its background object by one to a few pixels.

When a translucent image is processed in such an application program, the image is switched every time in very short period corresponding to one pixel or four pixels, for example. Therefore, the halftone image data FD and the dither pattern DP hardly match each other in this part, and as a result the compression ratio is decreased.

In contrast, if the position data TD are calculated by checking whether or not there is a matching arrangement pattern as described in this embodiment, the same arrangement pattern can be found in many cases because there is a periodicity in the pattern generated by the application program as described above as well as in the dither pattern DP. Note that comparison with the dither pattern DP is not performed here.

In this embodiment, if a matching arrangement pattern is found, approximately four bits are assigned to a signal indicating that the position data TD were calculated, and "260" is assigned to an attribution code for example, so that the encoding process is performed by the code 1. In addition, a value of the position data TD is expressed as data having a fixed length of approximately eight bits. In this case, therefore, the position data TD are expressed by twelve bits as a whole.

Supposing that one block TL is made up of twenty-four (4×6) pixels for example and that one pixel is made up of four bits, quantity of data of one block TL is 96 bits, which can be compressed by ⅛ when it is expressed by 12 bits.

Further, since a repeating period is constant in the case of the translucent image, the same position information is repeated in many cases. In this embodiment, it is supposed that if there are the same data as the last position data TD, a special flag of one bit is set so as to indicate the fact instead of a value of the position data TD. Therefore, if there are the same data as the last position data TD, they are expressed by total five bits including the signal of approximately four bits indicating that the position data TD were calculated and the special flag of one bit instead of the position data TD. Therefore, the quantity of data is reduced to approximately 1/20.

As described above, if the image data FD are characters or drawings, a large effect can be obtained by using the position data TD that improves the compression ratio substantially.

Second Embodiment

Next, a second embodiment of the present invention will be described. In the description of the second embodiment, a difference from the first embodiment will be described briefly.

[Calculation of Typical Value, the Second]

The typical value calculating portion 102 compares a dot pattern of the block TL with the dither pattern DP for calculating the typical value AP, and it determines whether or not they match each other. The determination whether or not they match each other is performed as follows.

It is supposed that there is uniform image data in which every pixel has one density value (or gradation value). The supposed image data are digitized into binary data by the dither pattern DP. If a dot pattern that is obtained by the digitization matches the dot pattern of the block TL, it is determined that the dot pattern of the block TL matches the dither pattern DP. The density value that is used for the determination may be any value. In other words, if there is a density value such that dot patterns match each other when the dot patterns are generated by using the dither pattern DP, it is determined that they match each other. Therefore, the density value may be a specific value or a plurality of values in a certain range. This density value is a typical value AP described above.

The typical value calculating portion 102 compares the dot pattern of the block TL with the dither pattern DP sequentially for every block from the left to the right and from the upper to the lower of binary image data D1 after the pseudo gradation process, for example. For example, it is performed for every block TL from the left end toward the right direction of a plurality of row unit (a band BD) on the upper side. When the row unit is finished, it goes back to the left end of a next row unit below the row unit. Then, the process is performed again for every one block TL toward the right direction in turn and finishes at the lower right end block TL.

The dither pattern DP that is used for the comparison is the dither pattern DP that supports each color of the binary image data D1. Then, a dither pattern DP for a character area is used first corresponding to each color. If the dither pattern DP for the character area does not match, a dither pattern DP for image area is used next. If the dither pattern DP for image area also does not match, a dither pattern DP for chart area is used. In this way, if the dither pattern DP does not match, it is switched in turn. Information that the dither pattern DP has been switched will be used in the encoding process as information for specifying the dither pattern DP that was used. If no dither pattern DP matches, a determination result indicating "NOT MATCH" is outputted.

If the determination result has matched, the typical value AP is determined as follows.

Figures 10A, 10B:
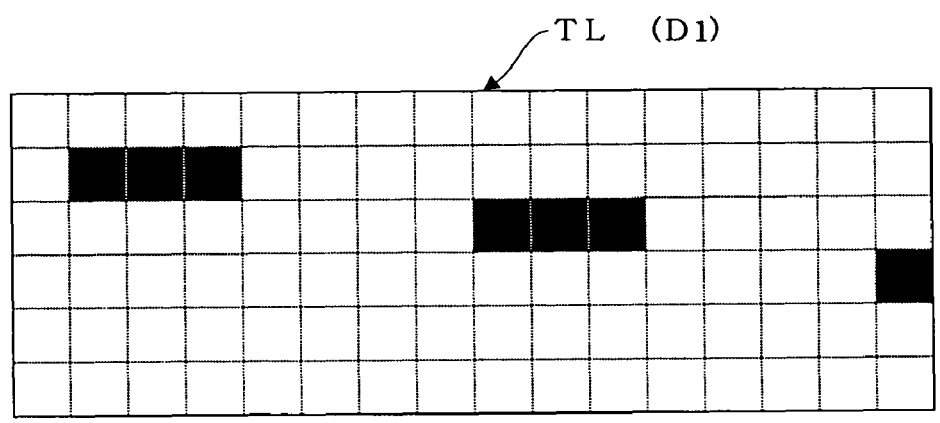
FIGS. 10A and 10B are diagrams showing examples of divided blocks and a dither pattern.

FIGS. 10A and 10B are diagrams showing examples of divided blocks TL and a dither pattern DP.

The block TL shown in FIG. 10A is made up of 96 (6×16) pixels, and the binary image data D1 are shown.

In FIG. 10A, black pixels are dotted pixels. Here, among the image data having gradation property before a binary process, image data of an area corresponding to the block TL is considered. Such image data are referred to as "image data FDL". Then, if a density value of each pixel of the image data FDL is less than the threshold value of the corresponding pixel of the dither pattern DP shown in FIG. 10B, it is regarded that the pixel is dotted. In other words, it is regarded here that the smaller a density value is, the higher a density is.

In this case, if a certain pixel is dotted, it can be said that a density value of the pixel is less than a threshold value of the corresponding pixel of the dither pattern DP. This can be said in other words such that a upper limit value of the density of the pixel was a value smaller by "1" than the threshold value of the corresponding pixel of the dither pattern DP. On the contrary, if the pixel is not dotted, a density value of the pixel is higher than or equal to the threshold value of the corresponding pixel of the dither pattern DP. This can be said in other words such that a lower limit value of the density of the pixel was the threshold value of the corresponding pixel of the dither pattern DP.

Therefore, the upper limit values and the lower limit values of pixels are summed up in the block TL and the dither pattern DP so that a minimum value J of the upper limit values and a maximum value K of the lower limit values are determined. If the following inequality (1) holds concerning the minimum value J of the upper limit values and the maximum value K of the lower limit values, there is a value of "a" satisfying the following inequality (2).

$$J \geq K \quad (1)$$

$$J \geq a \geq K \quad (2)$$

This value of "a" is the typical value AP. In other words, if the inequality (1) holds, the dot pattern of the block TL matches the dither pattern DP, so that the typical value "a" exists. If the typical value "a" is known, it is possible to reconstruct the dot pattern of the block TL from the dither pattern DP. In other words, only by determining one typical value "a" in each area as image information component, the reproduction of binary image data D1 in the area is possible by using the dither pattern DP matching the block TL.

Note that a value "a" that is the typical value AP may be referred to as a typical value "a".

Therefore, when this typical value "a" is sent to the printer 13, the printer 13 can reproduce the dot pattern of the binary image data D1 by using an appropriate dither pattern DP that is the same as in generating the binary image data D1.

Although it is regarded that a pixel is dotted if a density value of the pixel of the image data FDL is less than the threshold value of the dither pattern DP in the example shown in FIG. 10, it is possible to structure in a contrary manner that a pixel is dotted if a density value of the pixel of the image data FDL is larger than or equal to the threshold value of the dither pattern DP5 as another example that will be described later. In other words, it is possible that the larger the density value is, the higher the density is. In this case, if a certain pixel is dotted, a density value of the pixel is larger than or equal to the threshold value of a corresponding pixel of the dither pattern DP5, i.e., the lower limit value of the density of the pixel is the threshold value of the corresponding pixel of the dither pattern DP5. Then, if a pixel is not dotted, a density value of the pixel is less than the threshold value of the corresponding pixel of the dither pattern DP5, i.e., a value smaller by "1" than the threshold value of the corresponding pixel of the dither pattern DP5. Then, in this case, similarly to the case described above, the value "a" satisfying the inequality (2) is regarded as the typical value AP.

Supposing that the image data FD has 256 gradation values for each color, the typical value "a" has quantity of information corresponding to eight bits. In the embodiment shown in FIG. 10, the block TL has quantity of information corresponding to 6×16=96 bits. Since this can be expressed by eight bits, the quantity of information can be reduced to approximately one tenth. In addition, typical values "a" of neighboring blocks TL are close to each other in almost all image data FD. More specifically, there is a small difference between densities of neighboring areas, so that a difference of the typical value "a" is small. Therefore, a difference between a typical value "a" of a certain block TL and another typical value "a" of the block TL that was determined just before becomes "0" in many cases, so there will be a large bias of a statistical frequency. More specifically, when a difference of the typical value "a" is used instead of the typical value "a" itself, it is possible to perform the compression process with a higher compression ratio in the encoding process of Huffman method. Thus, it is possible to compress further to a fraction in the encoding process, for example.

Although an example is shown in FIG. 10 where the division is performed so that a size of the block TL becomes equal to a size of the dither pattern DP, it is possible that the sizes are different from each other.

As understood from the above description, the typical value AP can be determined by various methods. Next, an example of the method will be described, which is a method of determining the typical value AP by referring to a table that was created in advance.

As described above, what are necessary for determining the typical value AP are the minimum value J of the upper limit values and the maximum value K of the lower limit values of each pixel value corresponding to a dot pattern of a certain area. These are determined when the dither pattern DP is given, depending on a position thereof in the dither pattern DP and a dot pattern of the area. The position in the dither pattern DP can be expressed by two variables as coordinates of a leading pixel in the area. The dot pattern can be expressed by an integer within the range of 0-255 for one block if one block is made up of eight pixels that are digitized (see FIG. 16). In this case, no conversion process is necessary because an integer value can be obtained only by interpreting a dot pattern of the eight pixels as a numeric value. Therefore, it is sufficient if there is a table describing the minimum value J of the upper limit values and the maximum value K of the lower limit values corresponding to 256 dot patterns of 0-255 for each pixel of the dither pattern DP. In other words, if there is a table for converting data whose quantity is the product of the number of pixels of the dither pattern DP and the number 256, all the value can be described. If there is such a table, the values described in the position (the minimum value J and the maximum value K) can be retrieved easily at high speed by using the position coordinates in the dither pattern DP and an integer value of the dot pattern. In this embodiment, the table is generated as an upper and lower limit table TJK.

FIG. 11 is a diagram showing an example of the upper and lower limit table TJK.

The upper and lower limit table TJK shown in FIG. 11 indicates relationships for a certain dither pattern DP among coordinates in the dither pattern DP, the dot pattern, the minimum value J of the upper limit values and the maximum value K of the lower limit values.

Therefore, the block TL described above is divided into twelve micro blocks each of which includes eight pixels, and the minimum value J and the maximum value K are determined for each micro block. For example, if the coordinates of a micro block in the dither pattern DP is (0, 2) and an integer value of the dot pattern is "0", it is understood that the minimum value J is "255" and the maximum value K is "141" from the upper and lower limit table TJK.

The minimum value J and the maximum value K of the whole block TL are determined based on the minimum values J and the maximum values K of the twelve micro blocks obtained as described above. More specifically, the minimum value J of the block TL is the minimum value among the twelve minimum values J, while the maximum value K of the block TL is the maximum value among the twelve maximum values K.

In this way, by using the upper and lower limit table TJK, the process for calculating the typical value "a" can be realized by reading data out from the upper and lower limit table TJK having a data quantity of approximately 2M bytes at most. The reading out from the table can be performed at a high speed, so the typical value "a" can be determined fast. In addition, since this process is a large load on the whole compressing process, the total time of processing can be reduced substantially.

Note that the upper and lower limit table TJK can also be used for determining whether or not the micro block of the eight pixels matches the dither pattern DP.

As described above, the typical value "a" can be obtained from the obtained minimum value J and the maximum value K. The typical value "a" may be a particular value or a plurality of values that vary in a certain range. However, it is sufficient that the typical value "a" has one value for the printer 13 to reproduce a dot pattern of the binary image data D1. Therefore, a method for narrowing the obtained typical values "a" that vary in a certain range into a particular value will be described.

Figure 12:
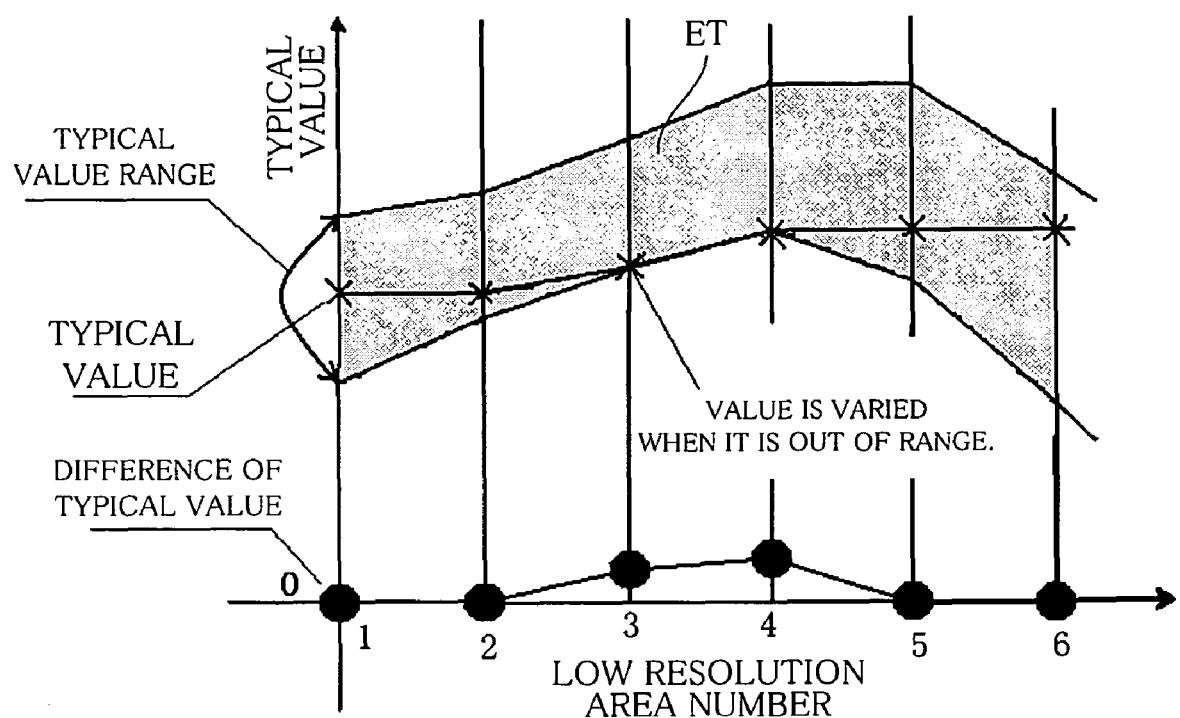
FIG. 12 is a diagram showing an example of transition of a typical value of a plurality of blocks.

FIG. 12 is a diagram showing an example of transition of a typical value of a plurality of blocks TL.

In FIG. 12, the horizontal axis indicates the number of the block TL, while the vertical axis indicates the typical value. As shown in FIG. 12, the typical value has a certain range ET. Therefore, the typical value "a" is determined so that a variation of the typical value "a" becomes as small as possible, i.e., so that a difference between typical values "a" of neighboring blocks TL becomes as close to zero as possible.

More specifically, the typical value "a" of the first block TL that is located at the left end position in FIG. 9 is determined to be a medium value in the range, and the typical value "a" of the second block TL that is located at the right side of the first block TL is made the same value as the first typical value "a". If the typical value "a" of the third block TL is made the same value as the second typical value "a", it goes out of the range. Therefore, the typical value "a" is determined so as to remain within the range. Also for the fourth block TL, the typical value "a" of it is determined so as to remain within the range similarly to the third block TL. The fifth typical value "a" is made the same value as the typical value "a" of the fourth typical value. Differences of the typical values "a" determined as described above are shown in the lower part of FIG. 12. When the difference of the typical value "a" becomes "0" in many cases, a bias of the frequency is increased so that a high compression ratio can be obtained in the encoding process by the Huffman method.

Since the range of possible values of the typical value "a" is 0-255, the range of the difference obtained by a simple subtraction is within −255 through +255, which needs nine bits as a quantity of information for expression. However, the difference is obtained not by a simple subtraction but by regarding that the typical value "a" is a circulating integer of 0-255 in this embodiment. Thus, every difference is expressed by an integer within the range of 0-255, which needs eight bits as a quantity of information for expression, so that the quantity is reduced to a half.

Next, the method for determining the difference by regarding it as a circulating integer will be described. For a simple description, a circulating integer in the range of 0-8 will be described.

Figure 13:
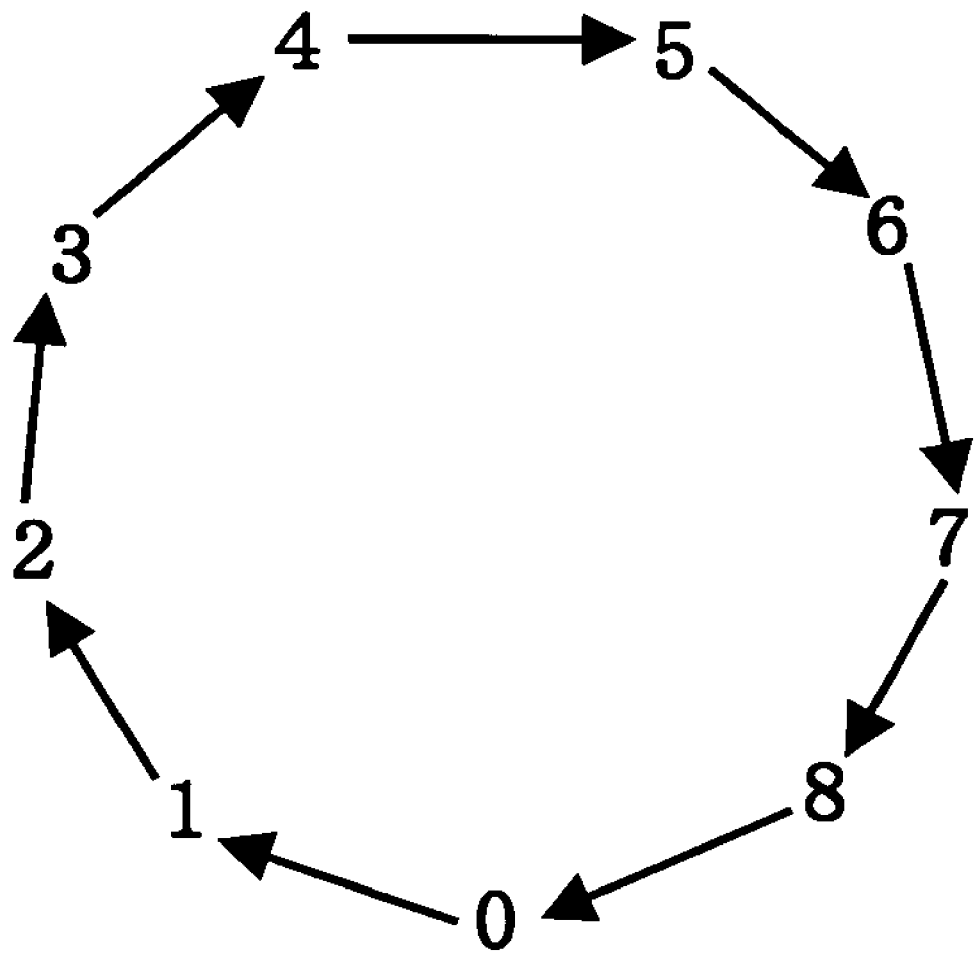
FIG. 13 is a diagram showing circulating integers.

FIG. 13 is a diagram showing circulating integers of 0-8.

In FIG. 13, in order to determine a difference C between a certain number A that is a reference and a certain number B, a position number corresponding to the number B is rotated in the left-handed direction from the position indicated by the number A among the circulating integers. Then, the numeric value of the stop position is regarded as the difference C. For example, a difference between "5" and "3" is obtained by rotating three in the left-handed direction from the "5" position in the circulating integers, and the result is "2". In another example, a difference between "0" and "8" is obtained by rotating eight in the left-handed direction from the "0" position in the circulating integers, and the result is "1". In still another example, a difference between "3" and "5" is obtained by rotating five in the left-handed direction from the "3" position in the circulating integer, and the result is "7". In this way, the difference is obtained as an integer value within the range of 0-8.

In addition, a certain number A is obtained by adding a difference C to a certain number B. In this case, the position number corresponding to the difference C is rotated in the right-handed direction from the position indicated by the number B in the circulating integer, and a numeric value of the stop position is regarded as the number A. Thus, the complete reconstruction can be performed.

Figure 14:
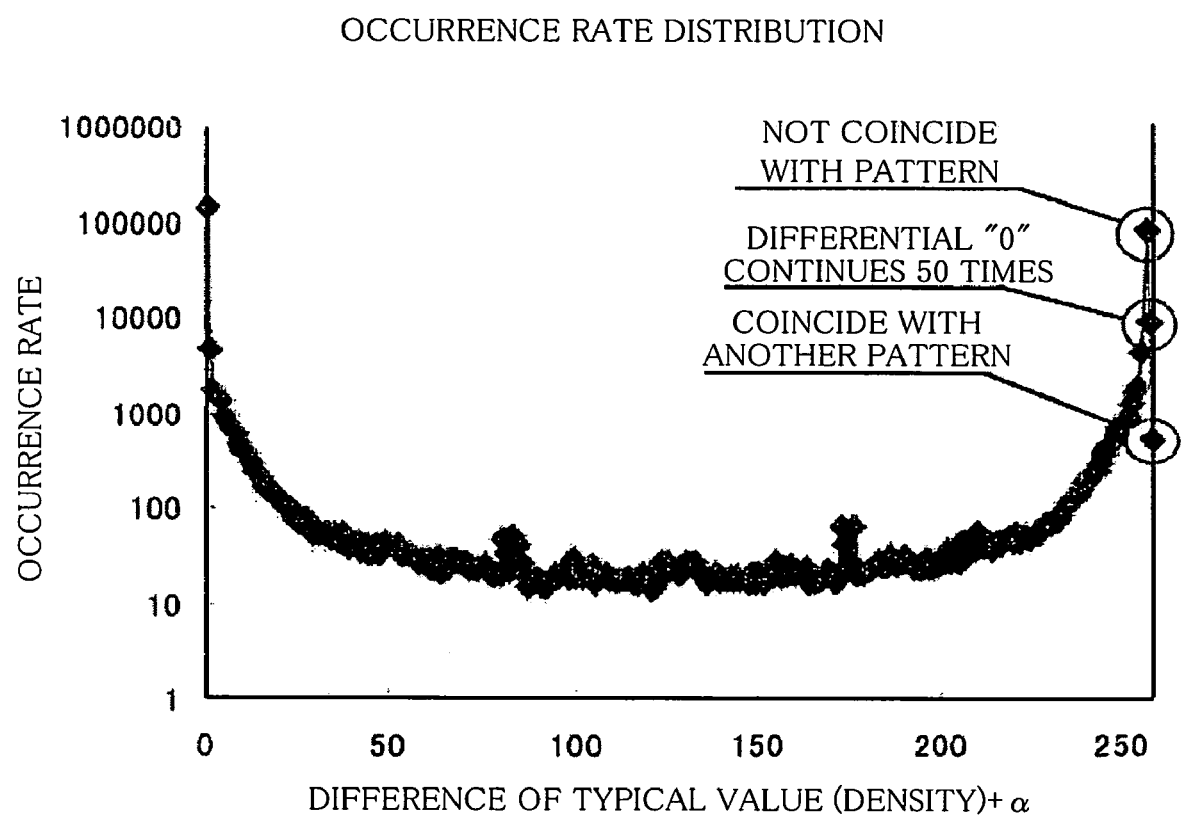
FIG. 14 is a diagram showing a distribution of an occurrence rate of a difference of typical values in an image.

FIG. 14 is a diagram showing a distribution of an occurrence rate of a difference of typical values "a" in an image.

As shown in FIG. 14, the occurrence rate is high in a range where the difference is approximately "0"-"20" or "230"-"255". This distribution is substantially the same regardless of a type of the image, and a bias is very large. Therefore, by using the difference, almost all images can be compressed substantially by the Huffman method.

For some images, one block TL can be compressed to approximately 1-2 bits. In addition, a probability that a dot pattern of a block TL including 6×16 pixels matches the dither pattern DP may be approximately 95% in most images. In other words, original data having 96 bits can be expressed by 1-2 bits in approximately 95% areas of the entire image, which means that the compression can be performed at a high compression ratio of dozens of times.

In FIG. 14, occurrence rates are indicated for three values of "256", "257" and "258" after 0-255 that is a difference of the typical values "a". The purpose of it is to indicate a predetermined state that may happen by particular three numeric values so that the quantity of information is further reduced, resulting in a higher compression ratio.

For example, pixels having the same density value may continue in an image frequently. Therefore, as being described later, if the same density value continues over 50 areas, i.e., if the difference "0" continues 50 times, it is expressed by one attribution code of "257". The attribution code "256" indicates that a block TL has not matched any dither pattern DP. The attribution code "258" indicates that the dither pattern DP has been switched, i.e., that a block TL has matched another dither pattern DP that had been switched. If the dither pattern DP has been switched twice, the attribution code "258" is outputted twice.

As described above, the typical value calculating portion 102 determines the typical values "a" in turn for the blocks TL, and a difference between neighboring areas is determined. In accordance with the difference, attribution value and the like, data to be sent to the encoding portion 105 are generated.

For example, if the difference "0" continues 50 times, the attribution value "257" is outputted to the encoding portion 108. The value of the difference "0" is not outputted. If the difference "0" has continued a certain number of times less than 50, the difference "0" is outputted for the certain number followed by an output of a difference that is not "0". If the dither pattern DP has been switched, the attribution code "258" is outputted for the number of the switching times. If the block TL has not matched any dither pattern DP, the attribution code "256" is outputted. In this case, it is possible to process the block TL by dividing it further into small blocks TM, for example.

[Process in Small Block]

Figure 15:
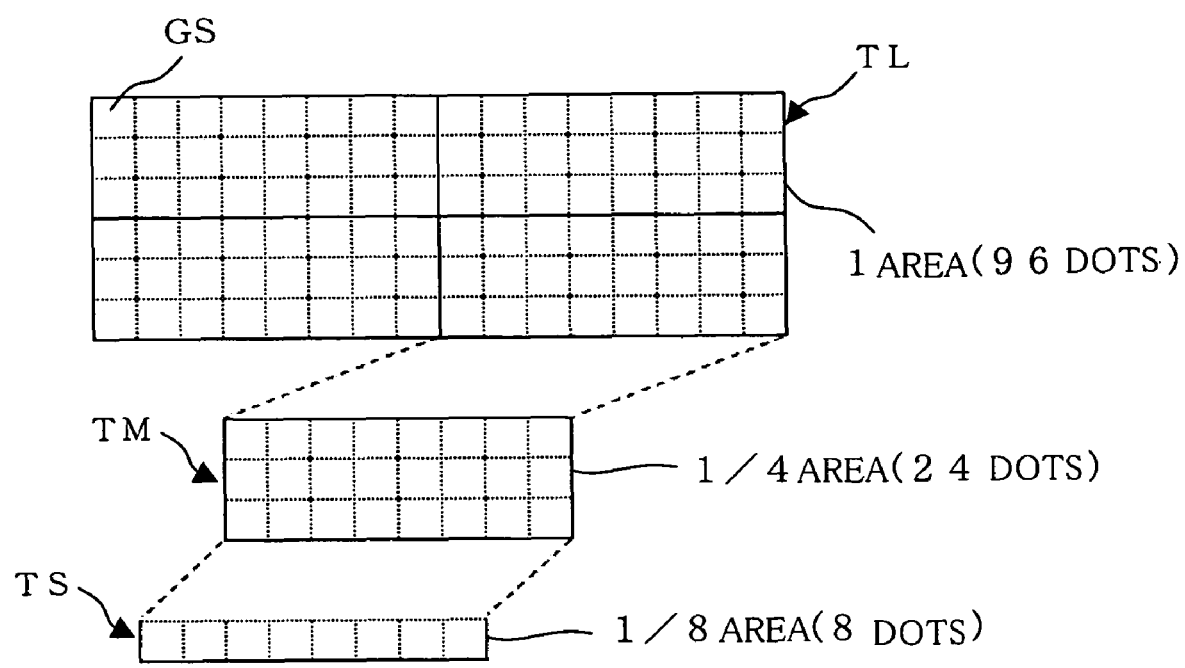
FIG. 15 is a diagram showing a block and a small block.
Figure 16:
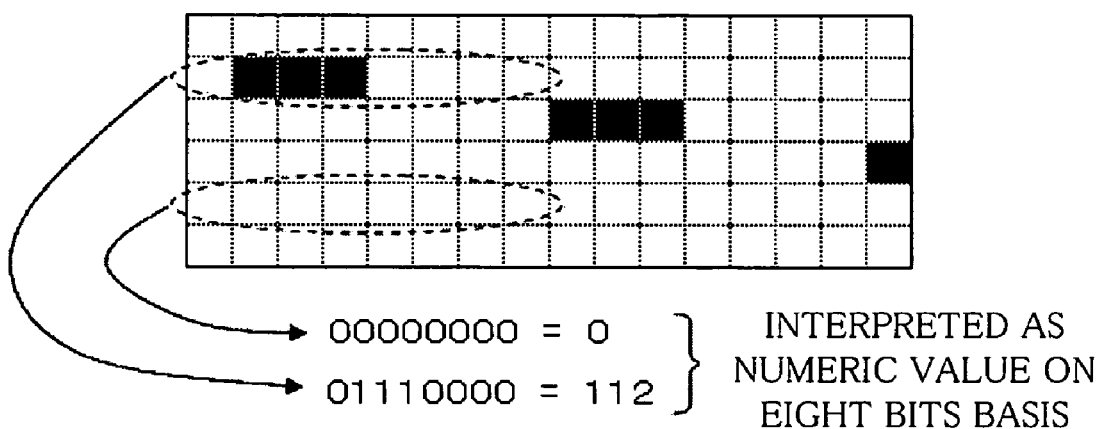
FIG. 16 is a diagram for explaining digitization of a dot pattern.
Figure 17:
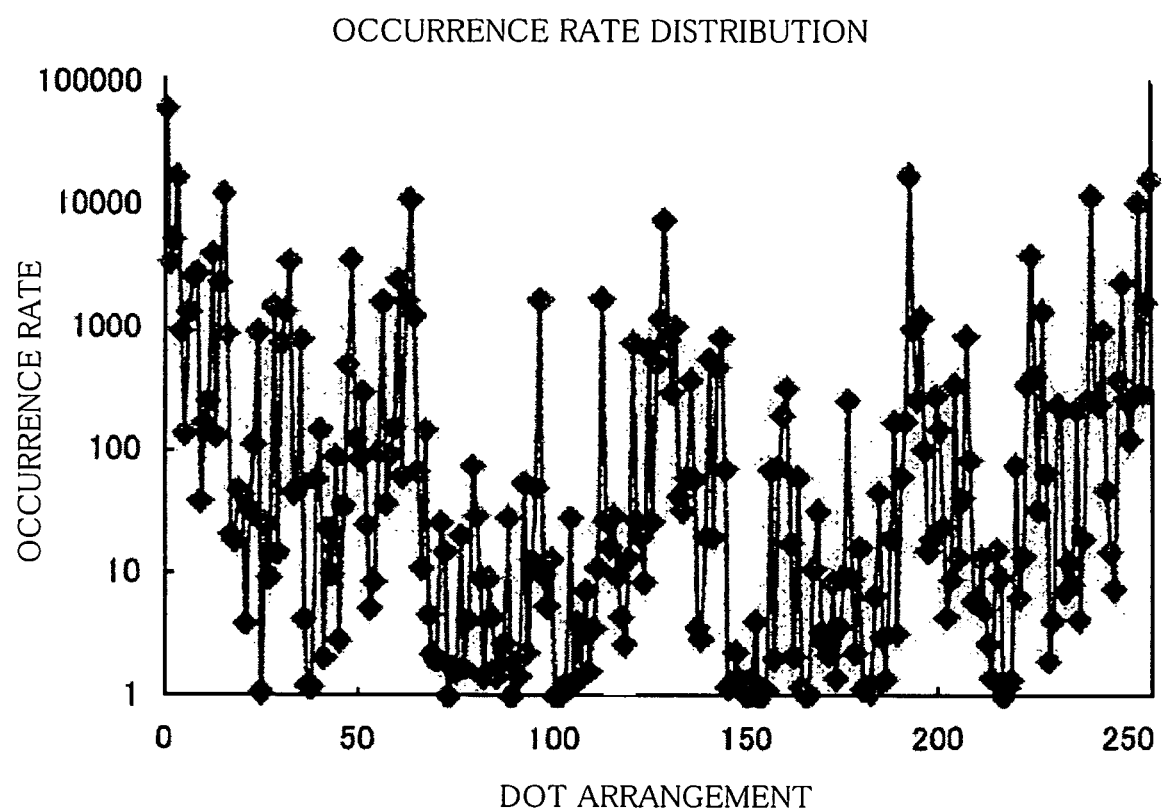
FIG. 17 is a diagram showing a distribution of an occurrence rate of each dot pattern.

FIG. 15 is a diagram showing a block TL and a small block TM, FIG. 16 is a diagram for explaining digitization of a dot pattern, and FIG. 17 is a diagram showing a distribution of an occurrence rate of each dot pattern.

As shown in FIG. 15, the pixel block TL of 6×16 pixels can be divided into four small blocks TM having 3×8 pixels.

In each of the small blocks TM, it is determined whether or not the dot pattern matches a part of the dither pattern DP by the method similar to the case of the block TL. More specifically, since the small block TM is made up of three micro block TS having eight pixels, it can be determined whether or not the dot pattern matches the dither pattern DP by reading the minimum value J and the maximum value K three times from the upper and lower limit table TJK described above and summing them up. Note that the determination whether or not the dot pattern matches the dither pattern DP is performed in the small block TM because a frequency of matching increases if the area decreases.

If the small block TM matches the dither pattern DP, the number of dots in the small block TM, e.g., the number of black dots is determined as the typical value. The small block TM has 24 dots in total. Even if the number of dots is regarded as the typical value, the quantity of information is not so many. In addition, the process of counting the number of dots is performed fast. It is possible to reconstruct the original dot pattern from the number of dots. Then, a difference of the typical value between neighboring small blocks TM is calculated based on the obtained typical value similarly to the case of the block TL described above. The difference here is within the range of 0-24 because the circulating integer described above is used.

When the process for four small blocks TM of one block TL is finished, the process goes back to a process for the block TL again.

[Process in the Case of Mismatching with Dither Pattern]

If the dot pattern has not matched in the small block TM too, the small block TM is further divided into three micro blocks TS having eight pixels, and a dot pattern of this micro block TS is digitized. In the digitization of dot pattern, a dotted pixel is expressed as "1" while an undotted pixel is expressed as "0" so as to make binary number, which is converted into a decimal number so as to output it as the attribution code as shown in FIG. 16, for example.

In addition, if the image data FD has 16 gradation levels, two pixels are expressed integrally by one byte data.

As shown in FIG. 17, there is a substantially biased distribution concentrating in a particular value. Therefore, in this case too, a high compression ratio can be obtained by the encoding process using the Huffman method. For example, approximately twice compression ratio can be obtained.

The encoding portion 105 encodes input data, i.e., a difference of typical value "a", a difference of the numbers of dots, an attribution code and the like by the Huffman method. The compression process by the Huffman method is very effective on an object having a frequency distribution of the signal that is not changed largely. The Huffman method itself is known, so description thereof will be omitted.

[Four-Valued Image Data]

Here, four-valued image data as an example of multivalued image data will be described. The case of the four-valued image data is basically the same as the case of compressing the binary image data.

Figure 18A:
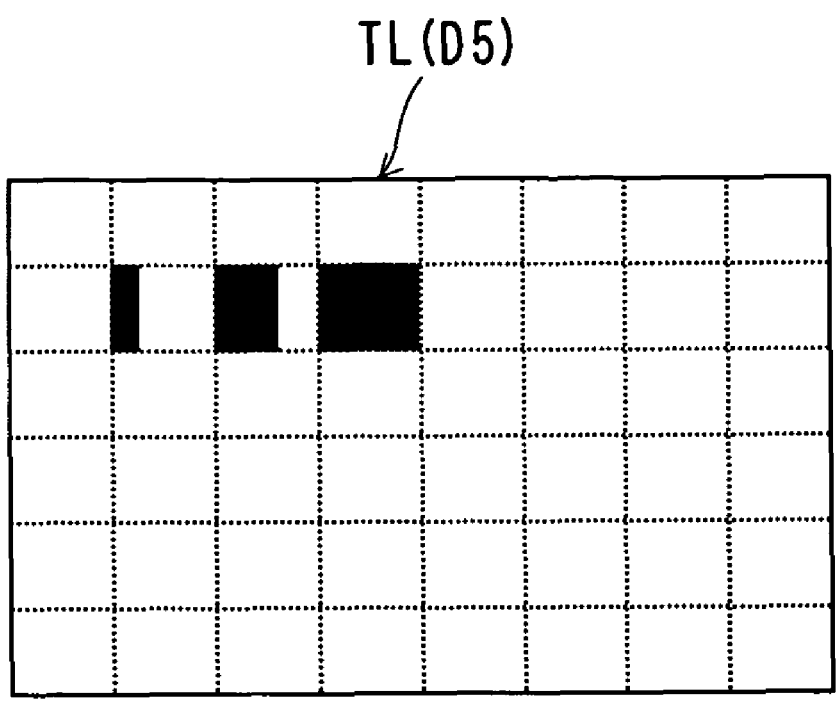
FIGS. 18A and 18B are diagrams showing examples of a block and a dither pattern.
Figure 18B:
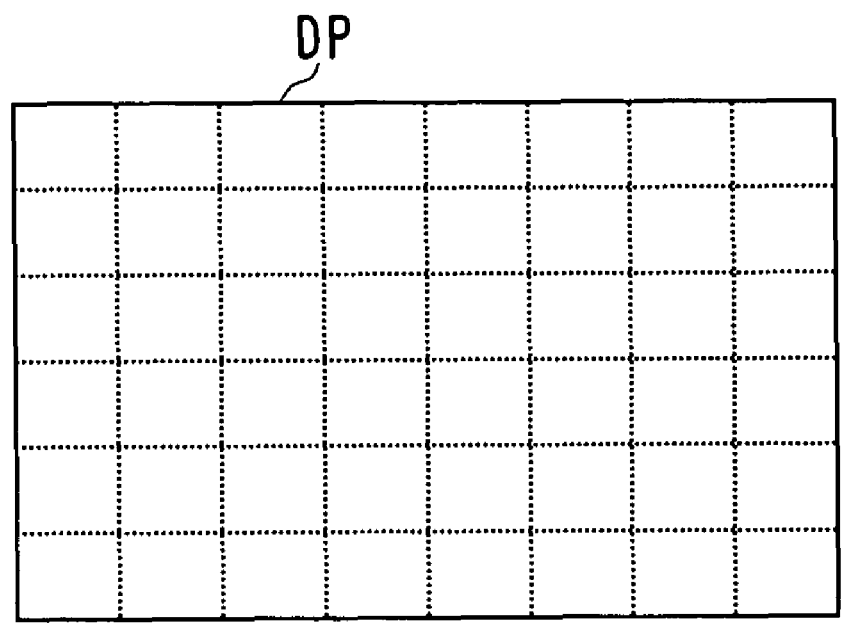
Figure 19:
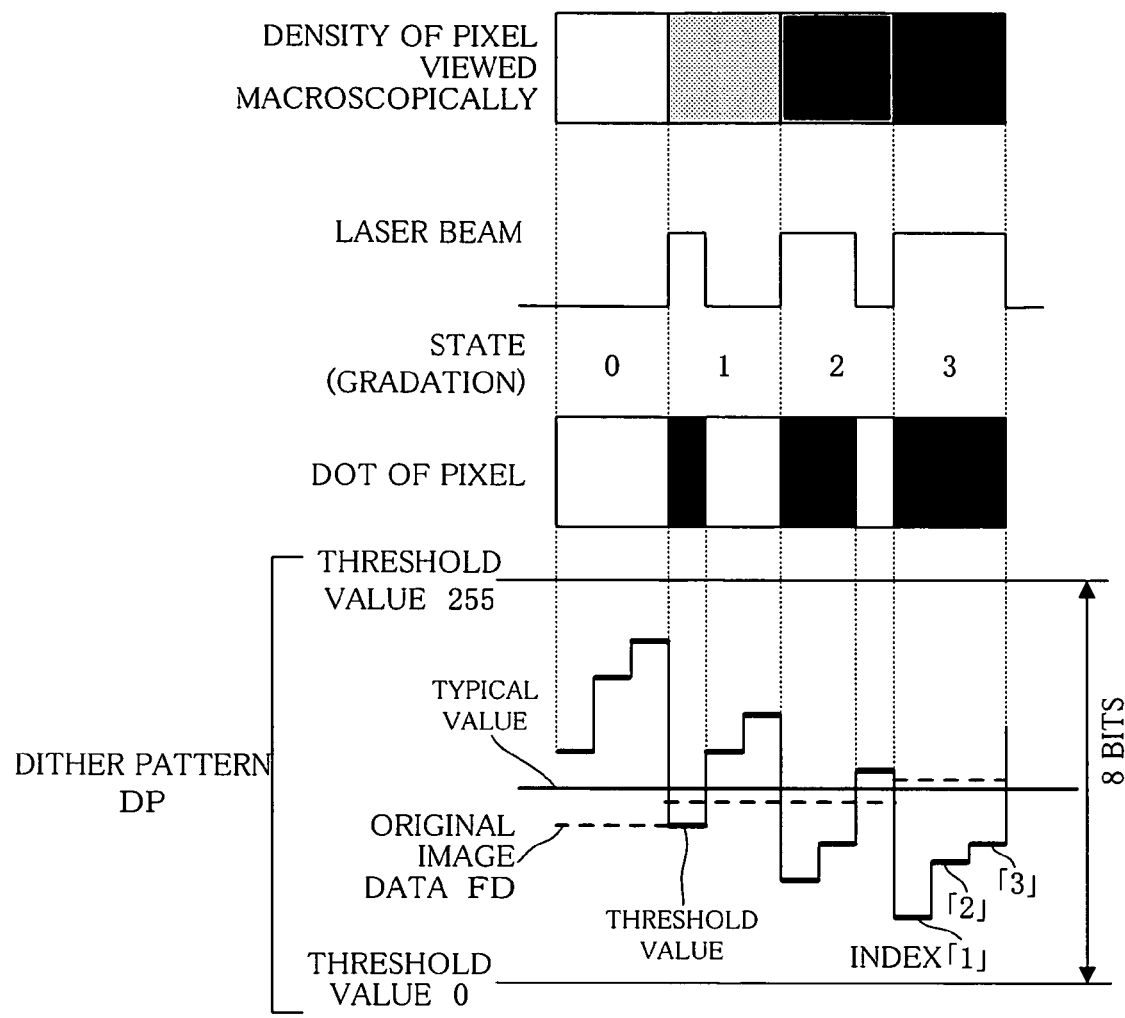
FIG. 19 is a diagram for explaining four-valued image data.
Figure 20:
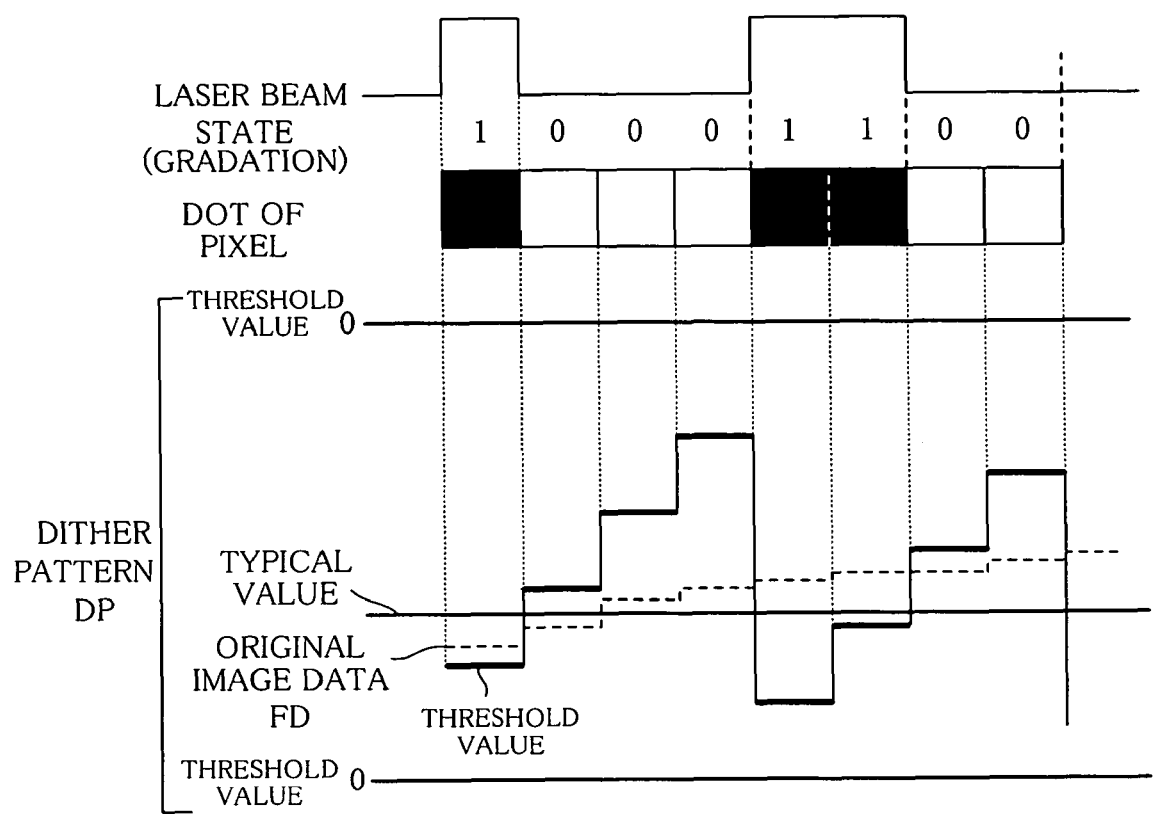
FIG. 20 is a diagram for explaining binary image data.
Figure 21:
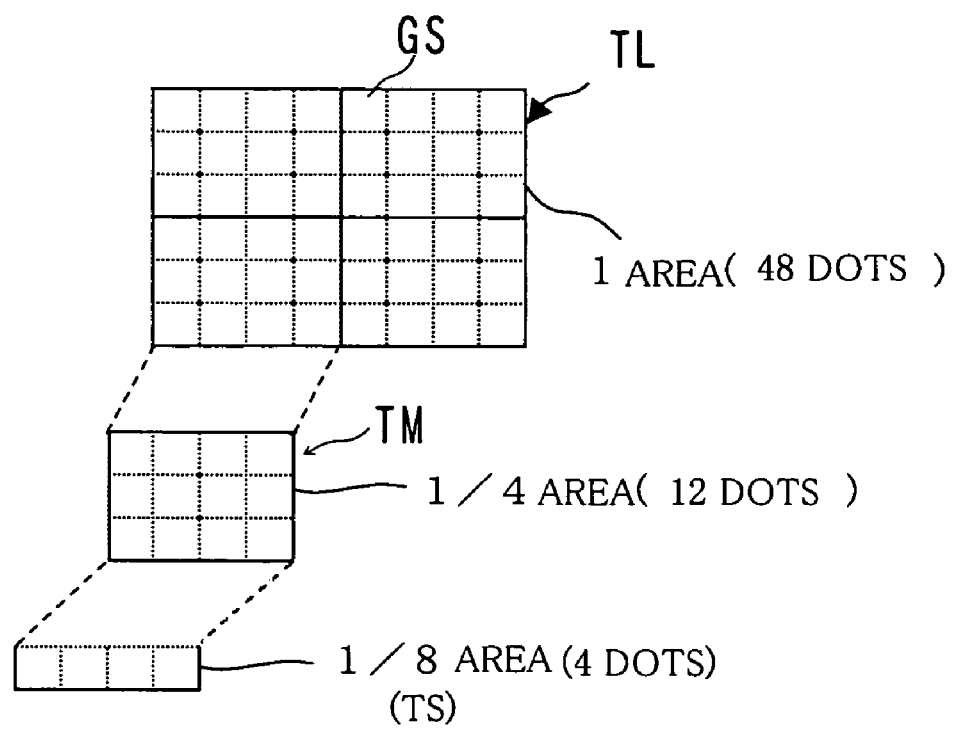
FIG. 21 is a diagram showing an example of further dividing a block into four small blocks.

FIGS. 18A and 18B are diagrams showing examples of a block TL and a dither pattern DP, FIG. 19 is a diagram for explaining four-valued image data D5, FIG. 20 is a diagram for explaining binary image data D1, FIG. 21 is a diagram showing an example of further dividing a block TL into four small blocks TM.

In FIGS. 18A and 18B, the block TL is a rectangular area made up of 48 (6×8) pixels GS. In the block TL shown in FIG. 18A, the black pixel is a dotted pixel. A size of the dot alters in three steps in accordance with a pixel value. More specifically, the undotted state is expressed by "0", the state where approximately a third of an area of one pixel is dotted is expressed by "1", the state where approximately two thirds of the area of the pixel is dotted is expressed by "2", and the state where all the area of the pixel is dotted is expressed by "3".

As shown in FIG. 19, a light emission period of a laser in the printer may be controlled (a pulse width control) in accordance with each state "0", "1", "2" or "3", for example, so that a density of a pixel can be altered in four steps. In this way, these states "0", "1", "2" and "3" correspond to gradation values.

More specifically, in the state "0", the laser does not emit light so that the pixel becomes "white". In the state "1", the laser emits light for a third of the period corresponding to the pixel width so that a third of the pixel area becomes "black". Similarly, in the state "2" or "3", the laser emits light for approximately two thirds or three thirds of the period corresponding to the pixel width so that two thirds or three thirds of the pixel area becomes "black". In other words, four gradation levels of density are obtained corresponding to the state values. The four states indicating the four gradation levels can be expressed by two bits. Therefore, eight bits can express four pixels having four gradation levels.

Note that a real relationship among a light emission period of the laser, a size of a dot formed by the light spot and a density viewed in a macroscopic manner is not simple, so the above description is merely an example.

A threshold value of the dither pattern DP has a value within the range of 0-255, and three threshold values are set for each pixel. In each pixel, indexes (numbers) "1", "2" and "3" are assigned to the three threshold values in the ascending order. The image data FD having a density value that is smaller than the lowest threshold value having the index "1" becomes the state "0". The image data FD having a density value between the threshold value having the index "1" and the threshold value having the index "2" becomes the state "1". The image data FD having a density value between the threshold value having the index "2" and the threshold value having the index "3" becomes the state "2". The image data FD having a density value that is larger than the highest threshold value having the index "3" becomes the state "3". Usually, different pixels have different threshold values with respect to the same index.

Here, binary image data will be described too for comparison.

As shown in FIG. 20, in the case of binary image data, density of a pixel can be altered in two steps, white and black by controlling on and off of the laser in the printer in accordance with each state "0" or "1, for example.

More specifically, in the state "0", the laser does not emit light so the pixel becomes "white". In the state "1", the laser emits light so that the pixel becomes "black". In other words, two gradation levels of density are obtained corresponding to the state values.

It is supposed here that if a density value of each pixel in the image data FD is larger than or equal to one of the threshold values of the corresponding pixel of the dither pattern DP, the pixel is dotted corresponding to the threshold value of the pixel. In other words, whether or not the pixel is dotted in this case depends not on the pixel but on each of the three threshold values corresponding to the pixel. Note that the larger the density value is, the higher the density is, here contrary to the above example of "Calculation of typical value, the second".

In this case, if a certain pixel is dotted by its threshold value, it means that a density value of the pixel is the corresponding threshold value or more. This can be translated into that the lower limit value of the density of the pixel is the same value as the corresponding threshold value. On the contrary, if the pixel is not dotted, it means that a density value of the pixel is less than the corresponding threshold value. This can be translated into that the upper limit value of the density of the pixel is smaller than the corresponding threshold value by "1".

In this way, the upper limit values and the lower limit values are summed up for each threshold value assigned to each pixel of the dither pattern DP, so that the minimum value J of the upper limit values and the maximum value K of the lower limit values are determined. Then, similarly to the above description, a value "a" satisfying the inequality (2) is regarded as the typical value.

If there are a plurality of values "a" satisfying the inequality (2), i.e., if there are typical values "a" in a certain range, a difference of typical values between neighboring areas becomes the minimum among such typical values "a" is used as the typical value "a", as described above.

Note that if no typical value is obtained, the block TL made up of an area of 6×8 pixels may be divided into small blocks TM made up of an area of 3×4 pixels as shown in FIG. 21. It may be further divided into three micro blocks TS made up of four pixels, if necessary.

In FIG. 21, a dot pattern of the block TL is compared with the dither pattern DP. If they match each other, a typical value "a" is determined as described above. If the typical value "a" cannot be determined in the block TL, it is checked whether or not the small block TM matches the dither pattern DP. If the small block TM matches the dither pattern DP, a typical value "a" satisfying the inequality (2) is determined. When the typical value "a" is obtained, a difference between typical values of neighboring small blocks TM is calculated based on the typical value "a.

In addition, if the small block TM does not match any dither pattern DP, the code "256" is outputted in the code 2. The area is further divided into micro blocks TS, and a dot pattern of the micro block TS is digitized.

[Reconstruction Process]

Next, the reconstruction process in the printer 13 will be described.

The data reconstructing portion 300 refers to a predetermined dither pattern DP and a decode table DC so that a dot pattern of the original image data FD is reproduced. When the compressed data D2 are reconstructed, a decode table DC1 for the block TL is used first for example so that the reconstruction process by the decode 1 is performed. In accordance with the condition, the reconstruction process is performed by the decode 2 using a decode table DC2 for the small block TM, or the reconstruction process is performed by the decode 3 using a decode table DC3 for the micro block TS. In other words, the reconstruction process is performed by the decode 1, 2 or 3 on the compressed data D2 encoded by the code 1, 2 or 3, respectively.

FIG. 22 is a diagram showing an example of the decode table DC2.

In FIG. 22, the decode table DC2 has items of the number of codes, Root, child 0, child 1 and the like. The original data can be obtained by tracing the decode table DC2 in turn from the position of Root=24 based on the input data. For example, if the input data are "011011", the start is the child 0 of Root=24 because the head of the data is "0". Since a value of the child 0 of Root=24 is "23" and the next value of the data is "1", the child 1 of Root=23 is noted next. Since a value of the child 1 of Root=23 is "22" and the next value of the data is "1", the child 1 of Root=22 is noted next. The same process is repeated until a value of the child 0 or the child 1 becomes negative. A sum of the value obtained finally (a negative value) and the number of codes ("26" in this case) is the original data. After that, the same process is repeated from the next value of the data until the expansion of the data is completed.

In the reproduction of the dot pattern, the reconstruction process is performed by the decode 1 first. If the value reconstructed with the decode table DC1 is "258", it indicates that the dither pattern DP has been switched. If a plurality of codes "258" continue, the dither pattern DP is switched in turn for the number of the continuation, and the dither pattern DP after switching is set as a dither pattern (a current dither pattern) DP that is used afterward.

If the reconstructed value is "256", the subsequent process is switched to the reconstruction process by the decode 2 using the decode table DC2 for the small block TM. If the reconstructed value is "257", it indicates that the code "0" has continued 50 times for the difference of typical values. Therefore, the dot pattern is reproduced by the same value as the typical value of the block TL that was calculates last time for 50 areas by the current dither pattern DP, and it is sent to a line buffer, e.g., the buffer memory 302. If the end of a line appears before completion of the process for 50 areas, the remaining data are sent to the line buffer as data of the next line. If the reconstructed value is neither "256" nor "257", the value is a difference of typical values. In this case, the typical value "a" of the block TL that was calculated last time is regarded as an initial value, and the difference is added to the initial value for obtaining a typical value "a" this time. In this way, typical values "a" of all blocks TL can be obtained by accumulating differences. If it is the first time this time, "0" is used as the initial value for obtaining the typical value "a". Then, a dot pattern is reproduced from the obtained typical value "a" and the current dither pattern DP, and it is sent to the line buffer.

In the reconstruction process by the decode 2, the reconstruction is performed using the decode table DC2 for a micro block TS. If the value reconstructed by the decode 2 is "25", the subsequent process is switched to the reconstruction process by the decode 3 for a micro block TS. If the reconstructed value is not "25", the value is a difference of typical values of the small block TM (the number of dots). In this case, a typical value is determined by accumulation in the same way as in the case of the block TL. A dot pattern of the small block TM is reproduced from the obtained typical value and the current dither pattern DP. When the process is finished for the four small blocks TM, the process goes back to the decode 1.

In the reconstruction process by the decode 3, the reconstruction is performed by using the decode table DC3 for a micro block TS. A result reconstructed by the decode 3 indicates an arrangement of dots for eight pixels. The reconstruction process is repeated for three micro blocks TS, so that a dot pattern of one small block TM is reproduced. Thus, completion of the reconstruction process for one small block TM is counted, and the process goes back to the decode 2 of the process that has called.

In this way, the attribution codes "256" and "25" work as signals for switching codes between areas. When these attribution codes appear, switching from the code 1 to the code 2 or from the code 2 to the code 3 is performed securely.

The line buffer stores temporarily binary image data sent from the data reconstructing portion 300. The binary image data stored in the line buffer is outputted and are printed on a paper sheet for every six lines, for example.

[Reconstruction Process by the Line]

Here, the method of performing the reconstruction process on a line basis will be described.

As described above, the entire of density values of pixels GS included in one block TL is expressed by one typical value AP and additional information FJ of a line, so that the reconstruction process is performed on a line basis.

More specifically, in order to modulate the laser diode LD with intensity for emitting light, image data must be retrieved on a line basis by using a line buffer. In order to perform the reconstruction process on a block basis, a buffer for expanding data on a block basis and a buffer for preventing the retrieved data from being split. Therefore, supposing that a vertical size of the block TL (the number of lines) is "4", the line buffer for total eight lines are necessary.

In order to avoid increase of capacity of the line buffer in this way, the compression process of data is performed on a block basis while the expansion process (reconstruction process) is performed on a line basis by transmitting separately the data on a block basis that can be used repeatedly as the same value for any line in the band and the data that are different for each line and are used only once for each line.

Figure 23:
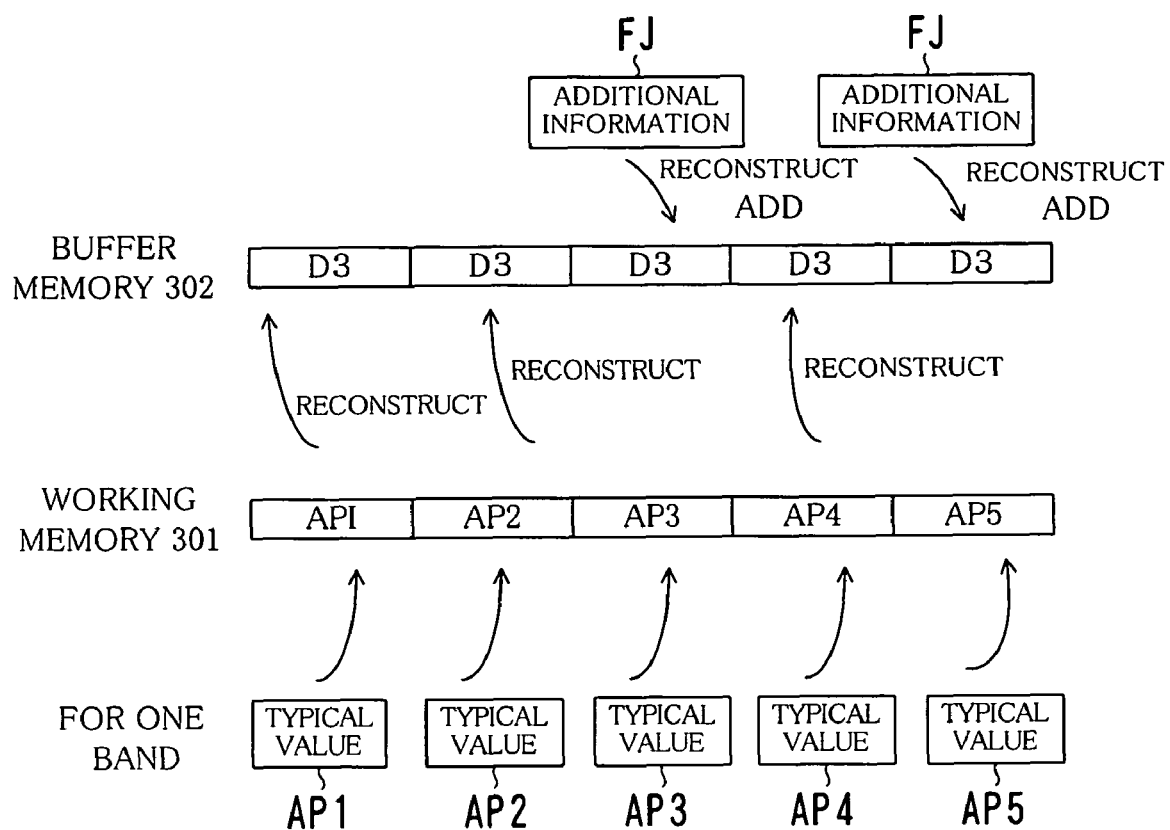
FIG. 23 is a diagram for explaining an expansion process into a buffer memory by the line.

FIG. 23 is a diagram for explaining the expansion process into a buffer memory by the line.

In FIG. 23, a case where typical values AP1-AP5 for a certain band BD are inputted is shown. The typical values AP1-AP5 for one band are recorded on the working memory 301 in this order. The typical values AP1-AP5 recorded on the working memory 301 are kept on the working memory 301 until the reconstruction process for the band BD is finished, and they are replaced with new typical values AP of the next band BD when they are inputted.

Since the typical value AP is usually less than data of the block TL for one line, a capacity (length) of the working memory 301 does not require for one line of the image data FD. In other words, although the buffer memory 302 requires a capacity for one line, a capacity of the working memory 301 may be approximately ½ of one line, for example.

Based on the typical value AP recorded on the working memory 301, the reconstruction process of the first line is performed first. At the start, a first block TL1 is reconstructed based on the typical value AP1, and the reconstructed data D3 are recorded (written) on the buffer memory 302 at the position corresponding to the block TL1. Next, based on a typical value AP2 the second block TL2 is reconstructed, and the reconstructed data D3 are recorded on the buffer memory 302 at the position corresponding to a block TL2.

Next, a third block TL3 would be reconstructed based on a typical value AP3. However, since the typical value AP3 is not a true typical value but a temporary typical value (also referred to as an extended typical value) in this example, the third block TL3 cannot be reconstructed based on the typical value AP3. In this case, the additional information FJ of the first line of the block TL3 is used for the reconstruction process, and the reconstructed data D3 are recorded on the buffer memory 302 at the position corresponding to the block TL3.

Based on a typical value AP4 a fourth block TL4 is reconstructed, and the reconstructed data D3 are recorded on the buffer memory 302 at the position corresponding to the block TL4. Although a fifth block TL5 would be reconstructed based on the typical value AP5, it cannot be reconstructed based on the temporary typical value AP5 in this example. Therefore, it is reconstructed based on the additional information FJ of the first line of the block TL5, and the reconstructed data D3 are recorded on the buffer memory 302 at the position corresponding to the block TL5.

The reconstructed data D3 that are contents of the buffer memory 302 are read in turn from the first address in the buffer memory 302 and are sent to the laser driving portion 390.

When the reconstructed data D3 are read out from the buffer memory 302, the reconstruction process of the second line is performed. In the reconstruction process of the second line, the third and the fifth blocks TL3 and TL5 are reconstructed based on the additional information FJ of the second line for each of the blocks TL3 and TL5.

Since writing on the buffer memory 302 can be performed just after the reconstructed data D3 are read, the reconstruction process of the second line can be performed before all the first reconstructed data D3 are read.

Then, concerning the second line too, the reconstructed data D3 recorded on the buffer memory 302 are read in turn and are sent to the laser driving portion 390.

In this way, recording of the reconstructed data D3 and reading of the recorded reconstructed data D3 based on the typical values AP1-AP5 and the additional information FJ are performed in turn until the fourth line. Thus, the reconstruction process for one band is performed. After the reconstruction process for one band, the reconstruction process for the next band BD is successively performed in the same way.

Here, the reading of the reconstructed data D3 from the buffer memory 302 is performed in synchronization with a speed of image formation in the print engine 400. Therefore, when the reading from the buffer memory 302 starts once, the reading must be performed at the same speed until all the image formation of the image data FD is finished. Therefore, it is necessary that a speed of recording of the reconstructed data D3 on the buffer memory 302 is higher than a speed of reading of the reconstructed data D3. In other words, a state control is performed so that the recording of the reconstructed data D3 of the next line is performed after reading the reconstructed data D3.

In this way, when one band BD is reconstructed, the typical values AP1-AP5 are used repeatedly four times for four lines, and each additional information FJ is used only once for the corresponding line.

Note that the reconstruction of the first line may be performed after all the typical values AP1-AP5 are recorded in the buffer memory 302, or it may be performed at the same time as recording each of the typical values AP1-AP5 on the buffer memory 302.

In addition, in the reconstruction of the first line, the reconstruction process based on the additional information FJ may be performed at the timing when the reconstruction process based on the typical value AP of the block TL should be performed, or it may be performed after all the reconstruction process of the blocks TL that can be reconstructed based on the typical value AP are finished.

Note that this control for the reconstruction process is performed by a process circuit provided to the data reconstructing portion 300 or by execution of a program as described above.

Figure 24:
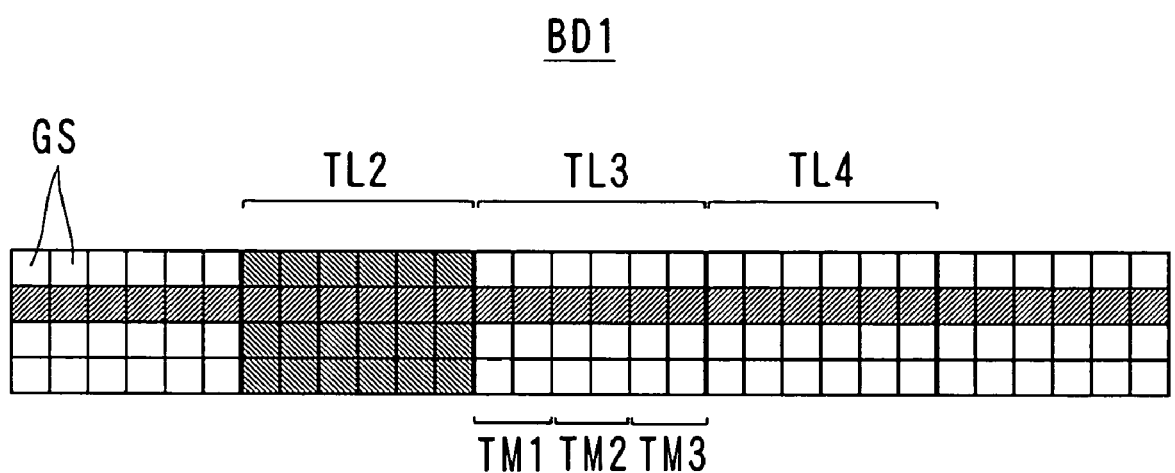
FIG. 24 is a diagram showing a relationship between a block and a line in a band.

FIG. 24 is a diagram showing a relationship between the block TL and a line in the band BD.

In FIG. 24, the band BD is made up of four lines, and image data are reconstructed for each of the lines as described above. Since the block TL is divided into small blocks TM1-TM3 along the line direction, each of the small blocks TM1-TM3 is also made up of four lines similarly to the block TL. Therefore, a typical value of the small block TM does not change even if the line changes.

As described above, if a typical value (a true typical value) AP is not found for a block TL, it is checked whether or not the same data exist in the previous area that is already compressed. If the same data exist, the position data TD is obtained. The position data TD are also data that do not change even if the line changes.

The block TL in which no typical value AP or no position data TD exist is data having eight bits in which two pixels are integrated. The data are different between lines.

The compressed data that do not change for each line (the typical value AP) are compressed at a first part of the block TL together with the data that change for each line of the first line (the additional information FJ). Concerning the second line and the subsequent lines, only the additional information FJ is compressed.

[Explanation of Concrete Example of Process on a Line Basis]

Next, a concrete example of the compression process and the expansion process on a line basis will be described.

Figure 25:
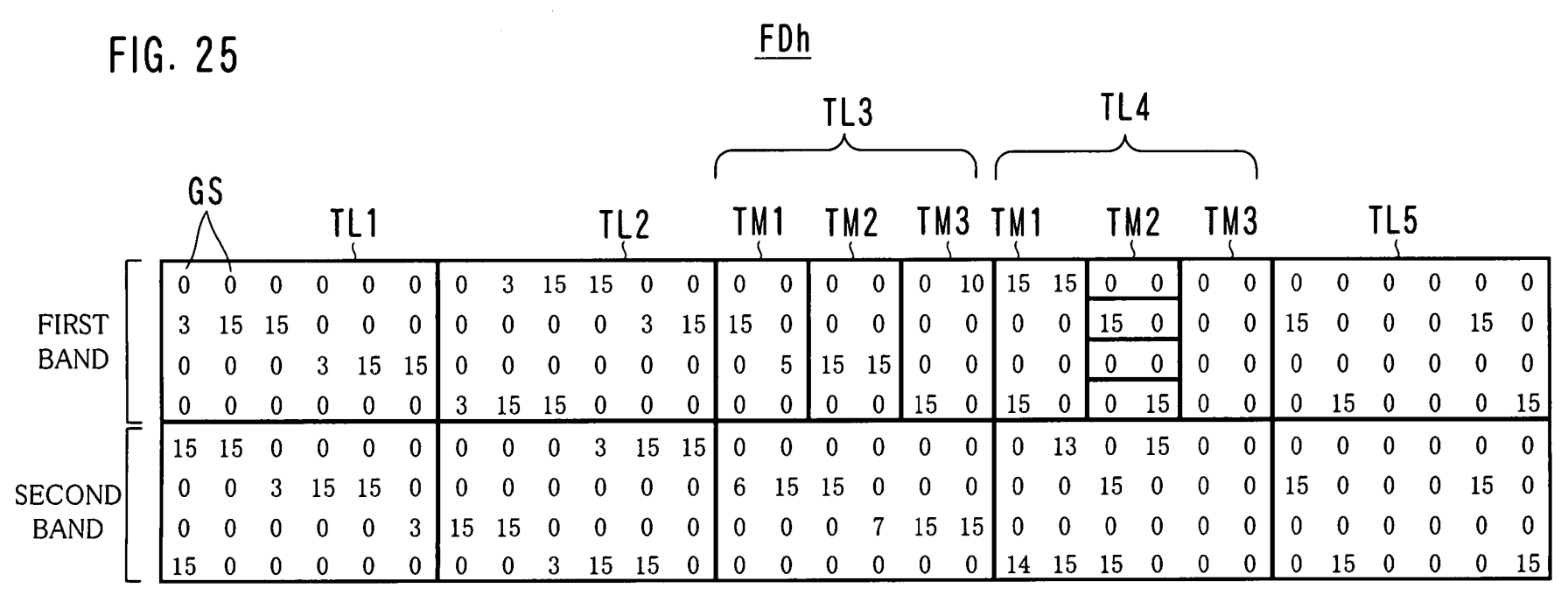
Figure 26:
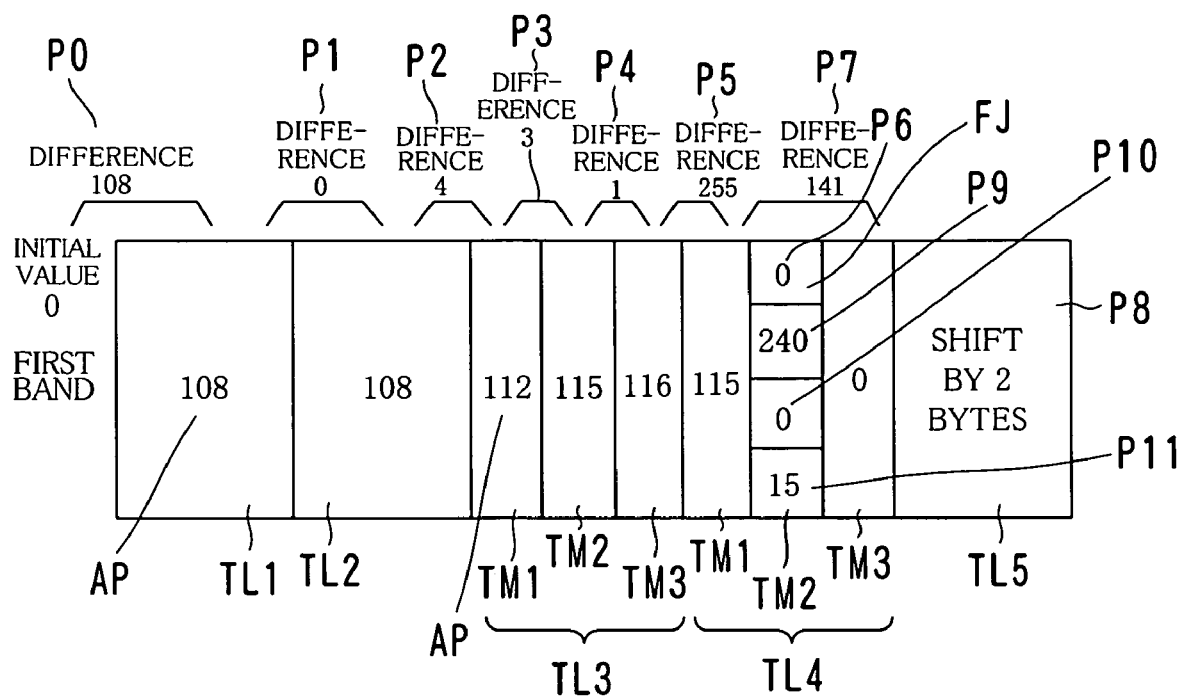
FIG. 26 is a diagram showing a typical value of a first band shown in FIG. 25.
Figure 27:
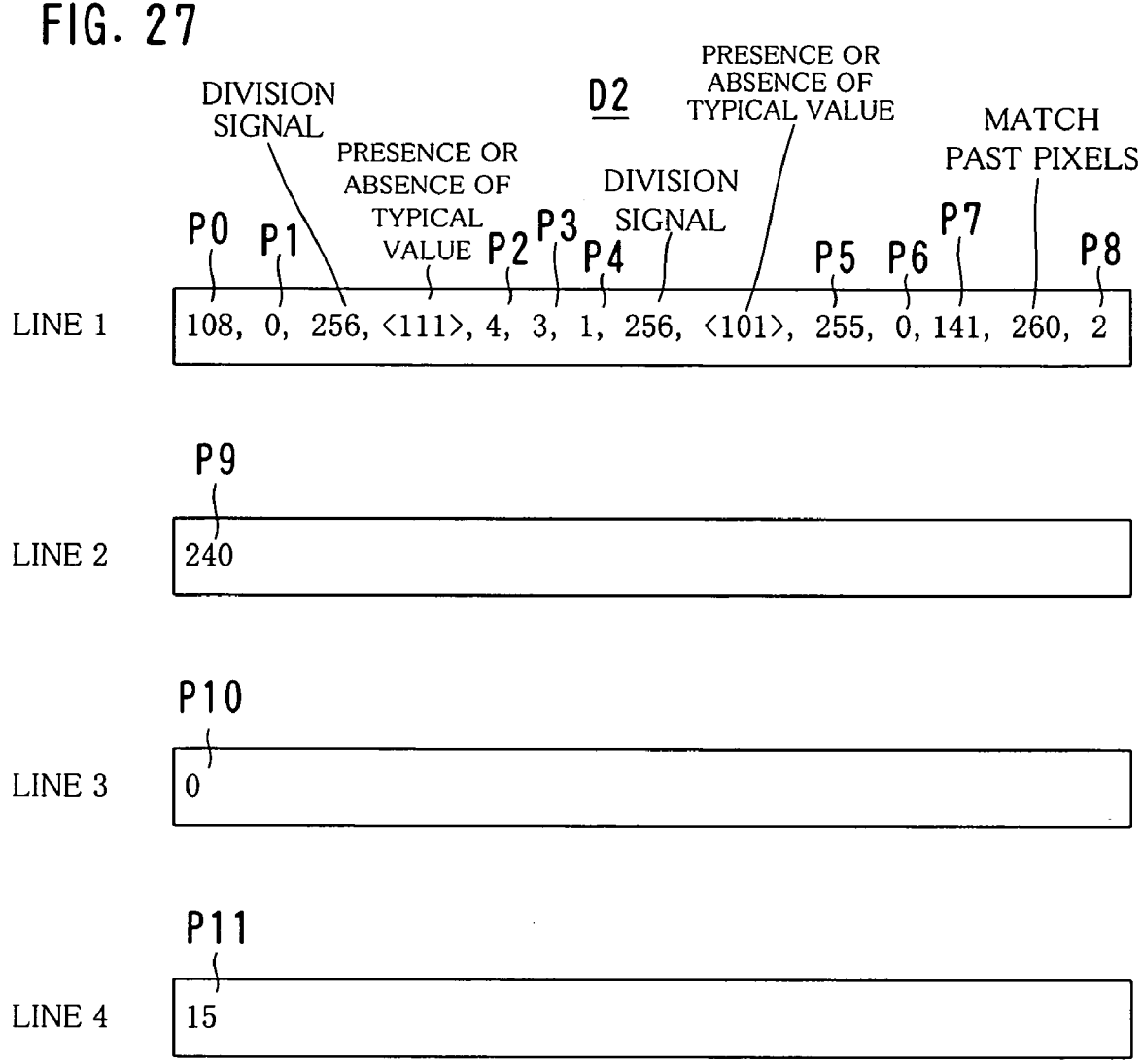
FIG. 27 is a diagram showing compressed data of the first band shown in FIG. 25.
Figure 29:
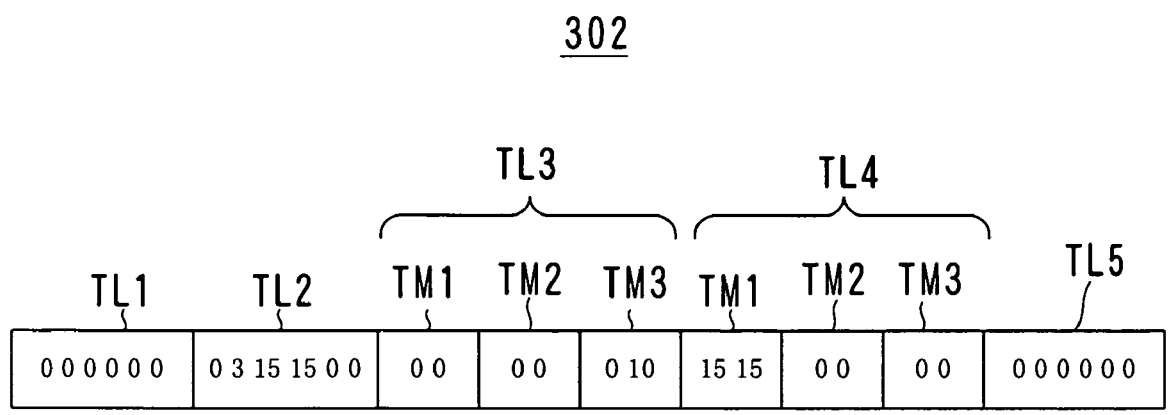
FIG. 29 is a diagram showing contents of the buffer memory that stores reconstructed image data.

FIG. 25 is a diagram showing an example of pseudo gradation image data FDh, FIG. 26 is a diagram showing a typical value AP of a first band of the pseudo gradation image data FDh shown in FIG. 25, FIG. 27 is a diagram showing compressed data D2 of the first band of the pseudo gradation image data FDh shown in FIG. 25, FIG. 28 is a diagram showing contents of the working memory 301 that stores compressed data D2 in the expansion process shown in FIG. 27, and FIG. 29 is a diagram showing contents of the buffer memory 302 that stores reconstructed image data for the line 1.

In FIG. 25, the pseudo gradation image data FDh are image data having 16 values. Therefore, each of the pixels GS can be a value within the range of 0-15 in the decimal notation. The pseudo gradation image data FDh are divided into five in the line direction, i.e., into blocks TL having four pixels in the vertical direction and six pixels in the horizontal direction. In other words, one band is made up of four lines. In the first band, each of the third and the fourth blocks TL3 and TL4 is further redivided into three small blocks TM1-TM3.

In FIG. 26, the typical value AP of each of the blocks TL or the small blocks TM is shown. For example, the typical values AP of the first and the second blocks TL are both "108". As to the third block TL3, the typical values AP of the first through the third small blocks TM1-TM3 are "112", "115" and "116", respectively.

As to the fourth block TL4, the second small block TM2 has no typical value AP, and additional information FJ is indicated in each line. This additional information FJ is expressed by a decimal number when values of two pixels GS in each line are expressed by data having one byte.

As to the fifth block TL5, an arrangement of pixels GS in the block TL5 is the same as the pixels GS in the past by four pixels, i.e., 2 bytes. Therefore, it is indicated as "shift by 2 bytes".

In addition, as to each typical value AP, a difference from a typical value AP of a neighboring block TL or a small block TM is indicated. The difference can be obtained by subtracting the previous typical value AP from the typical value AP. If the previous typical value AP is larger than the typical value AP, "256" is added to the difference value so that a positive value is obtained. More specifically, the initial value is "0", a difference between the initial value and the first typical value AP is "108", and a difference between the first and the second typical values AP is "0". A difference of typical value AP between the second block TL2 and the first small block TM1 of the third block TL3 is "4". A difference of typical value AP between the first and the second small blocks TM of the third block TL3 is "3". A difference between the third small block TM3 of the third block TL3 and the first small block TM1 of the fourth block TL4 is "255" that is obtained by adding "256" to the difference value "−1".

The order of "P0", "P1", "P2" and the like shown in FIG. 26 indicates an output order as the compressed data D2.

In FIG. 27, the compressed data D2 of the first line is shown as the line 1. In the line 1, a difference "108" between the initial value and the typical value AP in the first block TL1 is outputted first. Then, a difference "0" between typical values AP in the first block TL1 and the second block TL2 is outputted. After that, a division signal "256" indicating that the third block TL3 will be divided and a code "<111>" indicating whether a typical value AP exists or not for the divided small blocks TM1-TM3 are outputted. The code "<111>" indicating whether the typical value AP exists or not is data having three bits, and the positions indicate positions of the small blocks TM1-TM3, in which "1" indicates that the typical value exists while "0" indicates that the typical value does not exist.

Then, differences "4", "3" and "1" between the typical values AP in the first through the third small blocks TM1-TM3 of the third block TL3 are outputted. Next, the division signal "256" of the fourth block TL4 and a code "<101>" indicating whether or not each small block TM has the typical value AP are outputted. The code "<101>" indicating whether or not the small block TM has the typical value AP indicates that the second small block TM2 has no typical value AP. Therefore, the small block TM2 will be reconstructed afterward based on the additional information FJ. With respect to the first line, "0" as the additional information FJ is outputted next.

Then, a difference "141" between the typical values AP in the first and the third small blocks TM1 and TM3 of the fourth block TL4 is outputted. After that, a code "260" indicating that the fifth block TL5 matches pixels GS in the past and "2" as the number of shifting bytes are outputted.

By the compressed data D2 of the line 1 up to this, all the typical values AP for the first band and the additional information FJ of the line 1 in the first band are shown.

Next on the line 2, the additional information FJ of the line 2 in the second small block TM2 of the fourth block TL4 is outputted. On the line 3 and the line 4, additional information FJ of the lines 3 and 4 in the same small block TM2 are outputted.

Similar process is performed for other bands, and the encoding process is performed for them, so that generated compressed data D2 are transmitted to the printer 13.

Note that a process circuit or a program for performing this compressing process is provided to the compressed data creating portion 100. A process circuit or a program for performing the reconstruction process in the procedure corresponding to the compressing process is provided to the data reconstructing portion 300. When the printer 13 receives the compressed data D2 described above, it performs the reconstruction process as described below.

In FIG. 28, the working memory 301 has determined recording positions of the compressed data D2 corresponding to the blocks TL1-TL5. Based on the compressed data D2 of the line 1, data to be recorded on the working memory 301 are calculated and recorded at corresponding positions. At the position corresponding to the first block TL1, "108" as the typical value AP of the block TL1 is recorded in three that is equal to the number of small blocks TM in the redivision as shown in the upper position in FIG. 28. Thus, it is possible to avoid a change of the number of typical values AP depending on whether or not the redivision is performed. Note that it is possible to perform the reconstruction on a small block TM basis. It is possible to record only one typical value AP.

Under the typical value AP, "<0>" that is information indicating the expansion method, "<0>" that is information indicating whether or not the redivision is performed, "<000>" that is information indicating whether or not the typical value AP on the redivision exists, and "<0>" that is information indicating the dither pattern DP that was used are recorded in this order.

Note that in the information indicating the expansion method, "0" indicates the expansion by using the dither pattern DP while "1" indicates the expansion by duplicating past data. In the information indicating whether or not the redivision is performed, "0" indicates that the redivision is not performed, "1" indicates that the redivision is performed. In the information indicating whether or not the typical value AP on the redivision exists, "0" indicates that the typical value does not exist, "1" indicates that the typical value exists. The information indicating the dither pattern that was used is a code for specifying the dither pattern DP.

Therefore, as to the block TL1, the expansion is performed by using the dither pattern DP, the redivision is not performed, and the dither pattern DP of the code "0" is used.

In addition, as to the second block TL2, "108" that is the typical value AP of the block TL2 is recorded in three, the dither pattern DP is used for the expansion process, the redivision is not performed, and the dither pattern DP of the code "0" is used, which are recorded.

As to the third block TL3, the typical values AP of the three small blocks TM1-TM3 are "112", "115" and "116", the dither pattern DP is used for the expansion process, the redivision is performed, each of the small blocks TM1-TM3 has the typical value AP, and the dither pattern DP of the code "0" is used, which are recorded.

As to the fourth block TL4, the typical values AP of the two small blocks TM1 and TM3 are "115" and "0", the middle small block TM2 has no value as the typical value AP because the reconstruction is performed based on the additional information FJ, the dither pattern DP is used for the expansion process, the redivision is performed, only two small blocks TM1 and TM3 have the typical values AP, and the dither pattern DP of the code "0" is used, which are recorded.

As to the fifth block TL5, "2" that is the number of shifting bytes to the past data, expansion by duplicating the past data and no redivision are recorded.

The reconstruction is performed based on the compressed data D2 such as the typical value AP and the additional information FJ of each line recorded in the working memory 301.

As shown in FIG. 29, the reconstruction is performed for the first line initially. More specifically, as to the first block TL1, the pseudo gradation process is performed on the typical value "108" by using the dither pattern DP of the code "0", and the result is recorded on the buffer memory 302 at the position of the block TL1. Next, as to the second block TL2, the pseudo gradation process is performed on the typical value "108" by using the dither pattern DP of the code "0", and the result is recorded on the buffer memory 302 at the position of the block TL2. Note that pixel values are different in spite of using the same dither pattern DP because positions of the dither patterns DP to be used are different. As to the third block TL3, the pseudo gradation process is performed on the typical value "112", and the result is recorded at the position of the first small block TM in the block TL3. Similarly, the pseudo gradation process is performed on the typical values "115" and "116", and the results are recorded at the positions of the second and the third small blocks TM.

As to the fourth block TL4, the pseudo gradation process is performed on the typical value "115", and the result is recorded at the position of the first small block TM. The reconstruction process is performed by using "0" that is the additional information FJ of the line 1, and the result is recorded at the position of the second small block TM. The pseudo gradation process is performed on the typical value "0", and the result is recorded at the position of the third small block TM.

As to the fifth block TL5, previous data 2 bytes before are duplicated and are recorded at the position of the fifth block TL5. In this case, since the duplication of only one time may be insufficient for some data, the duplication is performed a plurality of times.

In addition, as to the second through the fourth lines, the reconstruction process is performed based on the compressed data D2 such as the typical value AP and the additional information FJ of the lines 2-4 recorded on the working memory 301.

[Calculation of Typical Value in Case of Two Dimension]

In the above description with reference to FIGS. 19 and 20, it is supposed that the divided block TL is one-dimensional for determining the typical value AP. Actually, however, the block TL is two-dimensional. Therefore, the case of two dimension will be described here. For the case of two dimension, a "straight line" in the interpolation rule HR in the case of one dimension may be replaced with a "plane".

Figure 30:
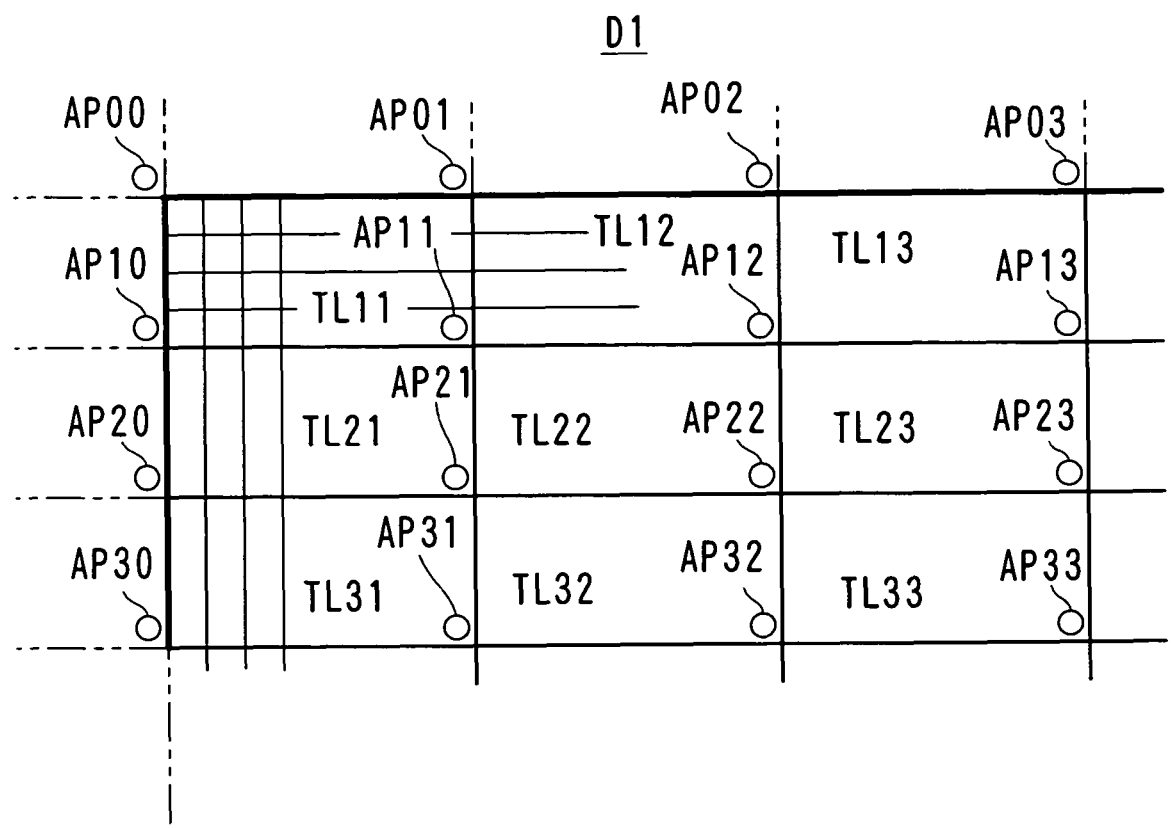
FIG. 30 is a diagram showing positions of typical values in each of the blocks.
Figure 31A:
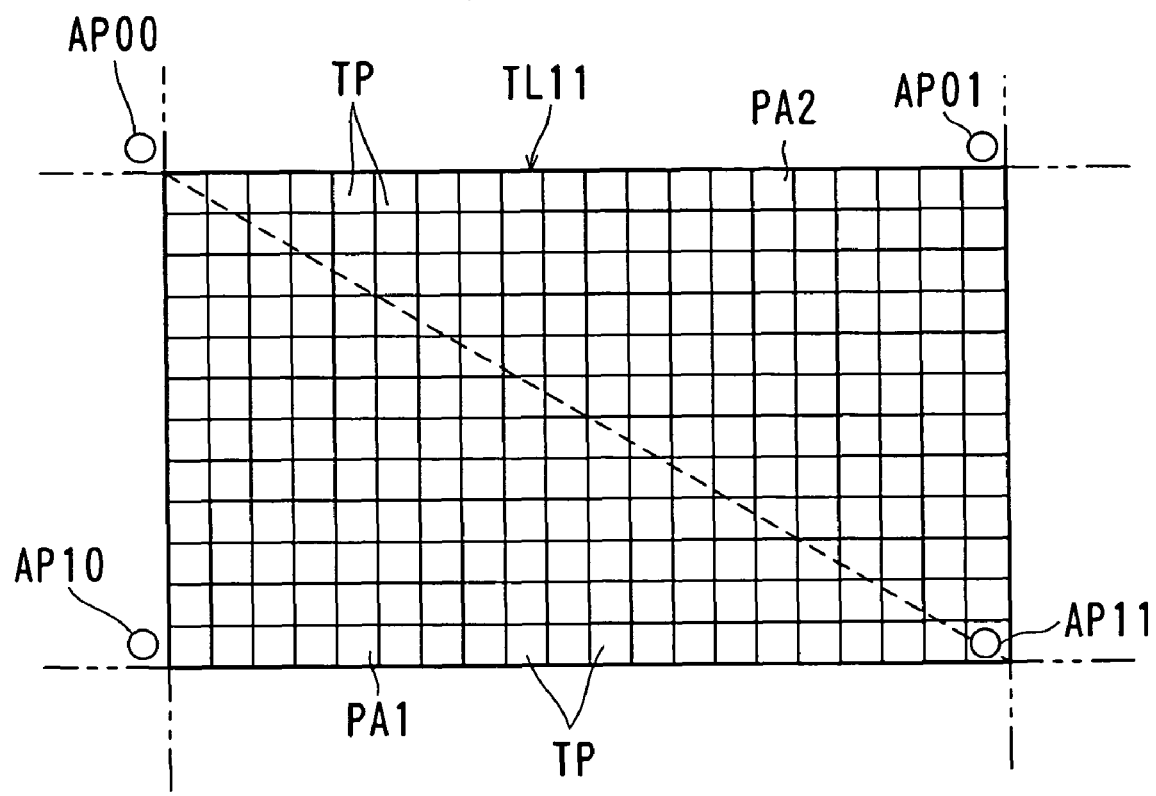
FIGS. 31A and 31B are diagrams for explaining an example of an interpolation rule.
Figure 31B:
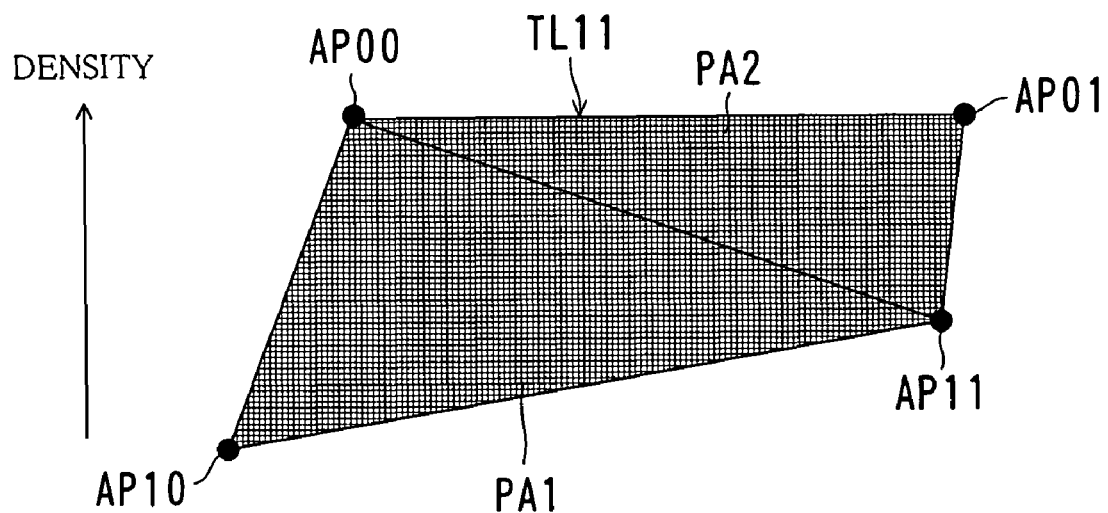

FIG. 30 is a diagram showing positions of typical values "a" in each of the blocks TL, FIGS. 31A and 31B are diagrams for explaining an example of an interpolation rule HR when a density value of each pixel in the block TL is determined by interpolation.

In FIG. 30, as to a part of the binary image data D1, positions of the typical values AP in the blocks TL are shown. As shown in FIG. 30, the typical value position APmn of each block TLmn is at the lower right end of each block TLmn. Also outside the area of the binary image data D1, the typical value position AP is at the lower right end of each block supposing that division is performed similarly to the block TL.

As shown in FIGS. 31A and 31B, the first typical values AP00, AP10 and AP01 are determined initially. Since the first typical values AP00, AP10 and AP01 are out of the area of the binary image data D1, they can be any values. It is preferable that they are intermediate values in the area of the image data calculated based on the density value (halftone data) of the pixel GS that is closest to the typical value position AP of the block TL11 and the threshold value of the corresponding dither pattern DP.

Then, the block TL11 that is the first block is regarded as a noted area, and the noted area is divided into two triangles PA1 and PA2 as shown in FIG. 31. As to the area of one triangle PA1, a white pixel in the area is noted. Planes that pass two typical value positions AP00 and AP10 that are close to a vertex of the triangle PA1 among the first typical values AP00, AP10 and AP01 and pass the threshold value corresponding to the white pixel in the noted area are determined.

Among the planes, the plane at the lowest position is selected. The plane is extended, and the intersection point with the position of the last pixel TP in the noted area is regarded as an upper limit candidate position. As to the area of the other triangle PA2, the upper limit candidate position is obtained similarly. A smaller one of the two obtained upper limit candidate positions is regarded as a typical value upper limit APmax in the noted area.

A similar process to a white pixel is performed for a black pixel, so that a typical value lower limit APmin in the noted area is determined. Note that TP indicates a position corresponding to each pixel in FIG. 31B.

If the typical value upper limit APmax obtained in this way is larger than the typical value lower limit APmin, i.e., if the above inequality (1) holds, a value between the typical value upper limit APmax and the typical value lower limit APmin, e.g., a medium value between them is determined to be the typical value AP11 of the block TL11.

When the typical value AP11 determined in this way is used, the binary image data D1 of the block TL11 can be reproduced completely by using the dither pattern DP, the triangles PA1 and PA2 defined by the typical values AP00 and AP10 or the typical values AP00 and AP01 of the neighboring area.

If the above inequality (1) does not hold, the last typical values AP00, AP10 and AP01 are corrected. By using the corrected typical value AP, the typical value AP11 of the noted area is determined again as described above.

If the typical value AP is still not determined, the fact that the typical value AP cannot be determined is recorded, and another process is performed. As the other process, similarly to the case of one dimension, the noted area is divided into small areas having a half or a quarter, for example. Then, the above process is performed in each small area so that the typical value AP is determined.

In addition, if the typical value AP is not determined in the small area, the typical value upper limit APmax and the typical value lower limit APmin are determined temporarily and appropriately so that an intermediate value in the range is determined to be the typical value AP.

[Description by Flowchart]

Next, processes performed by the computer main body 11 and the printer 13 will be described with reference to flowcharts.

Figure 32:
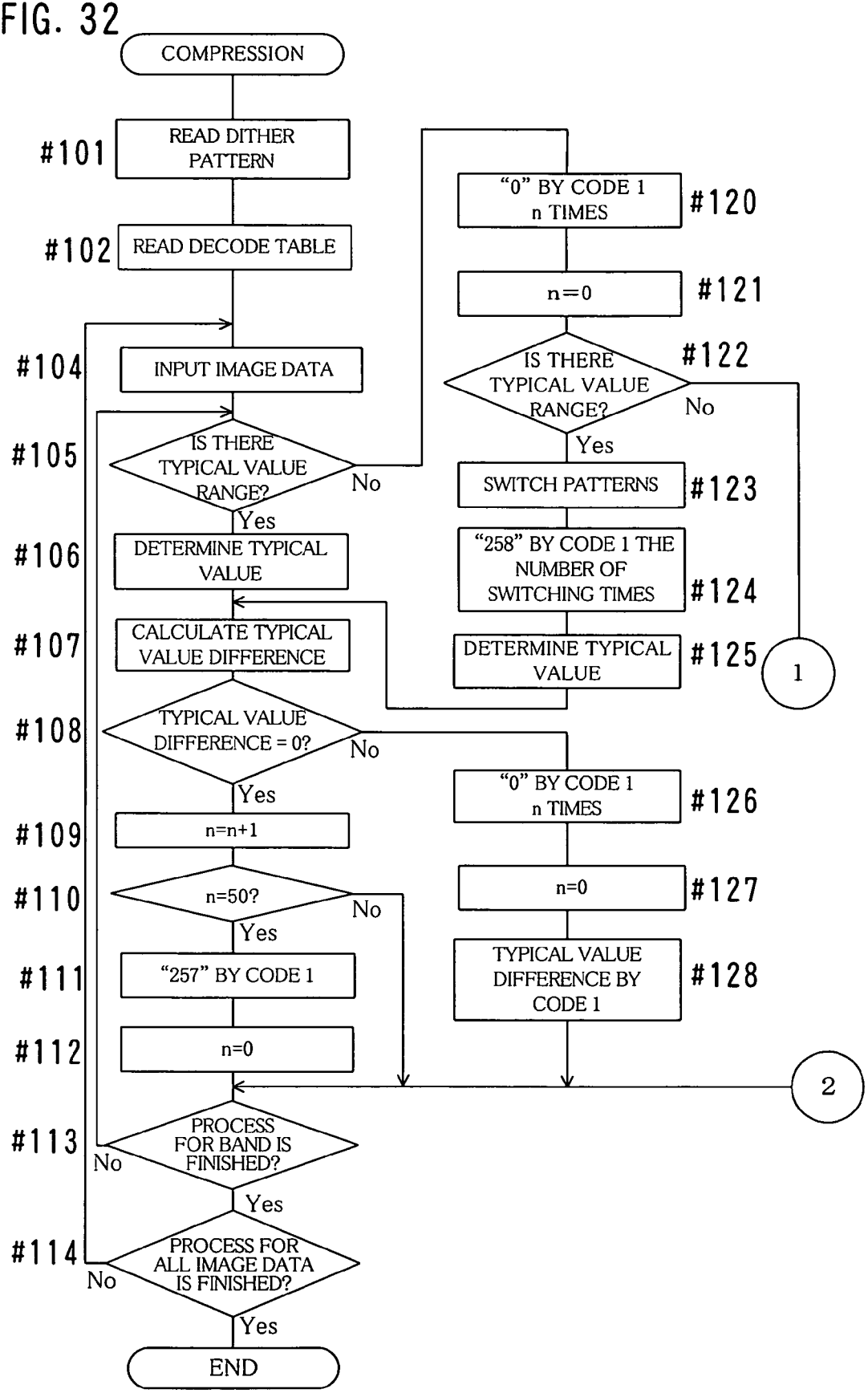
FIG. 32 is a flowchart of a compressing process performed by the compressed data creating portion.
Figure 33:
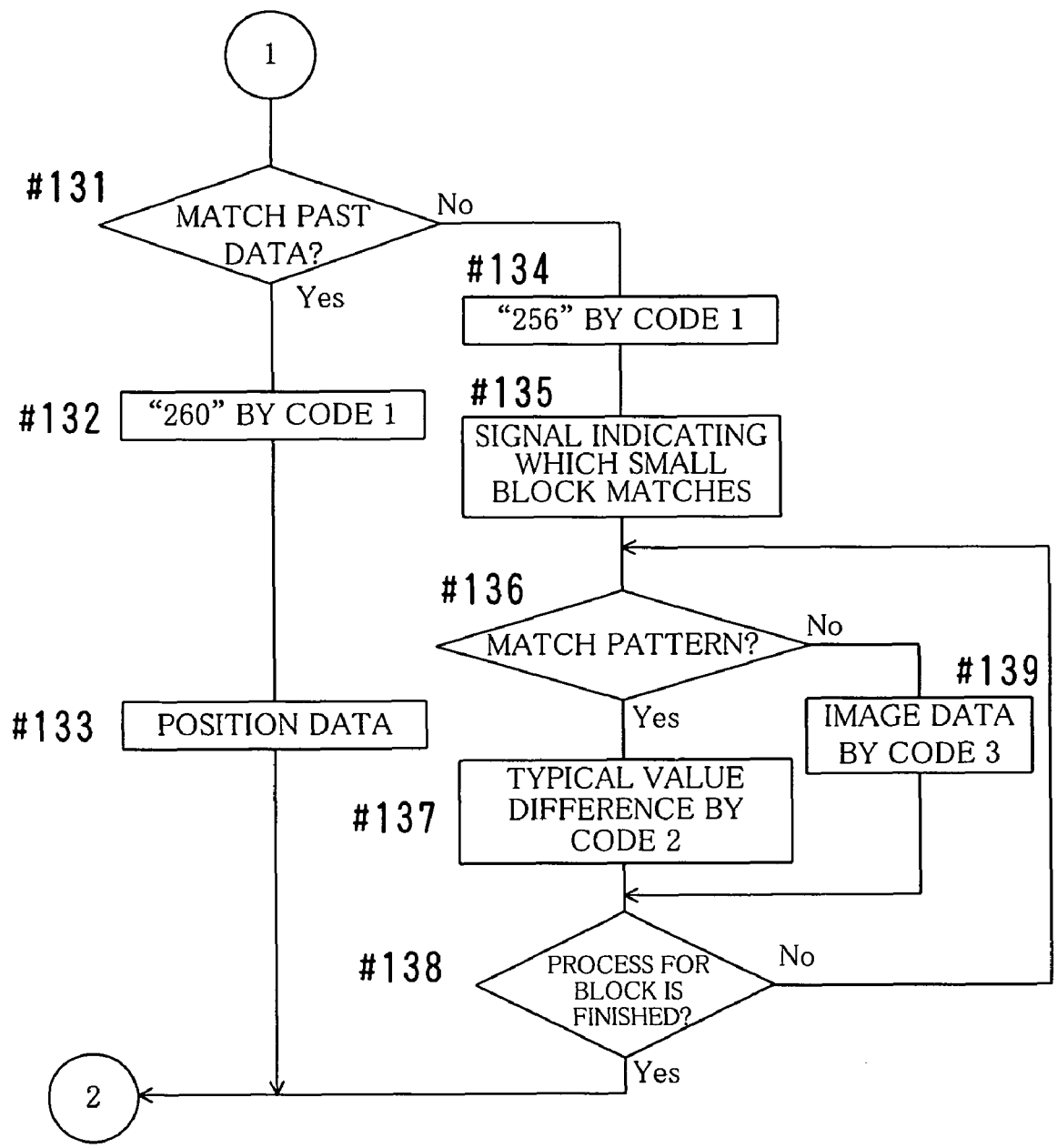
FIG. 33 is a flowchart of a compressing process performed by the compressed data creating portion.
Figure 34:
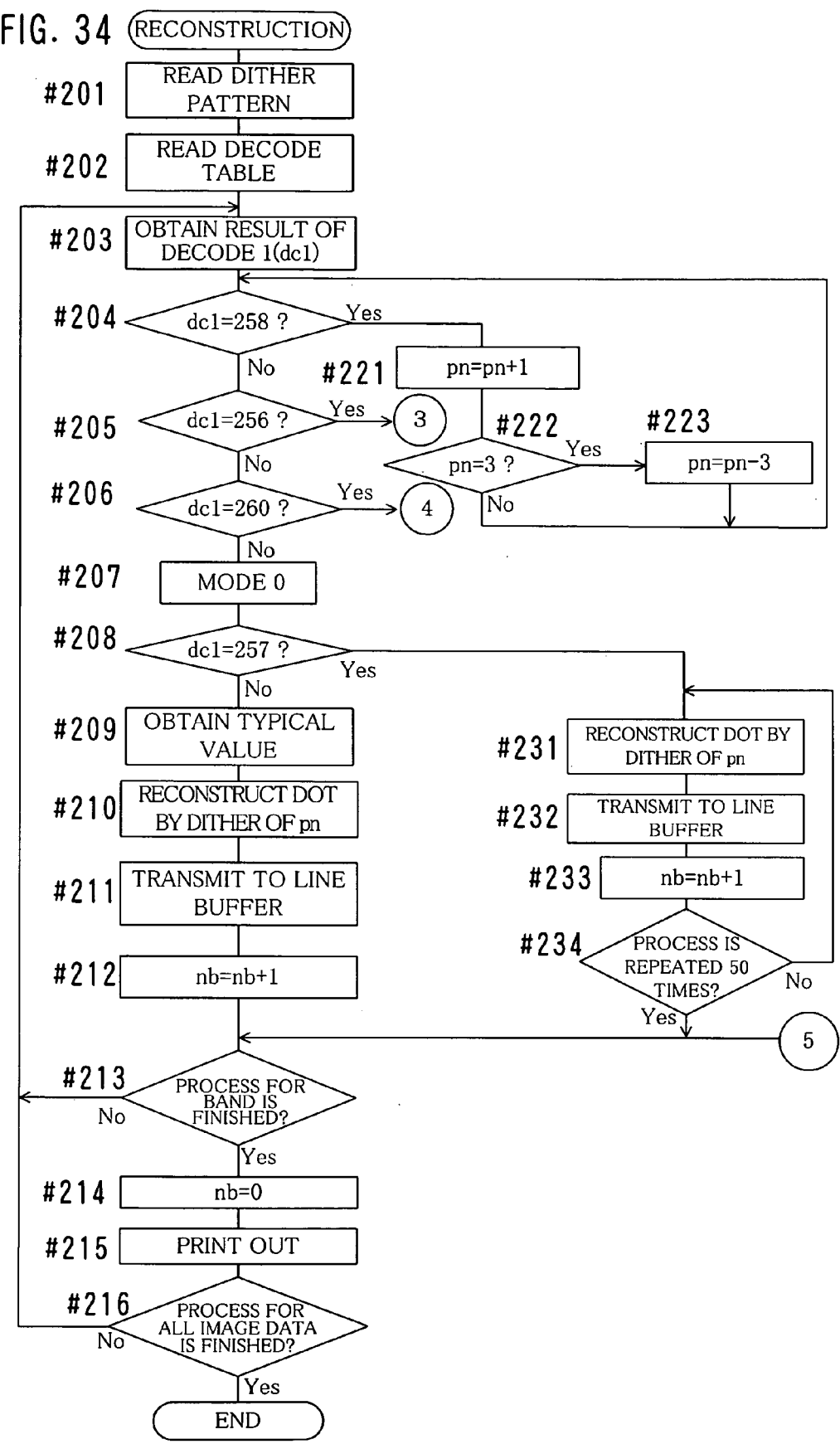
FIG. 34 is a flowchart of a reconstruction process performed by a data reconstructing portion.
Figure 35:
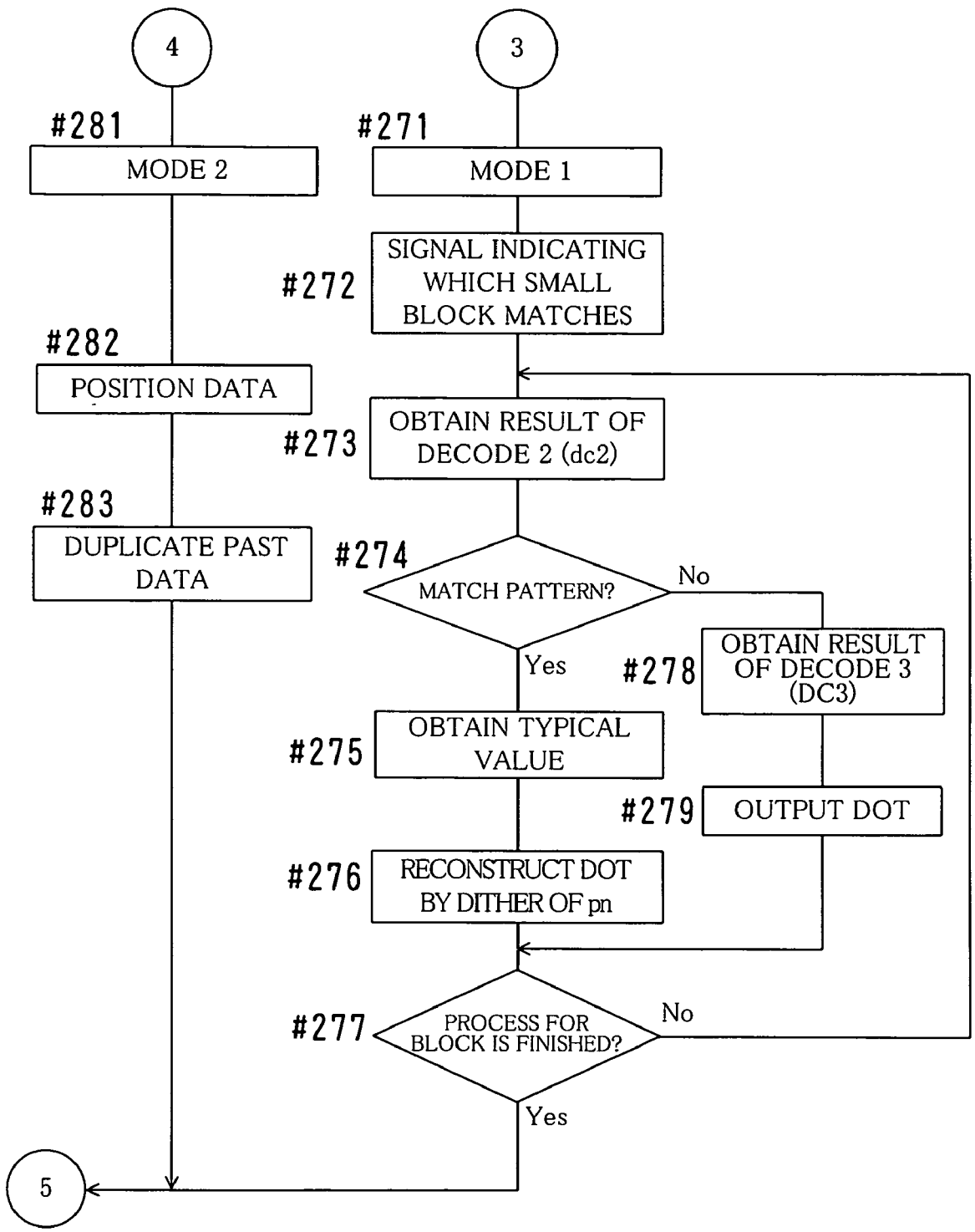
FIG. 35 is a flowchart of a reconstruction process performed by the data reconstructing portion.

FIGS. 32 and 33 are flowcharts of a compressing process performed by the compressed data creating portion 100, and FIGS. 34 and 35 are flowcharts of a reconstruction process performed by the data reconstructing portion 300. Note that these flowcharts show processes for one of C, M, Y and K color components.

In FIGS. 32 and 33, the dither pattern DP and the decode table DC are read first (#101 and #102). In addition, the dither pattern DP and the decode table DC are sent to the printer 13 in advance. One band of the image data is inputted (#104), and it is determined whether or not one block TL from the left end matches the dither pattern DP (#105). If it matches, the typical value "a" is obtained by referring to the upper and lower limit table TJK (#106), and the typical value difference is calculated (#107).

If the typical value difference is "0" (Yes in #108), a variable n indicating the number of continuing times is incremented (#109). When the variable n becomes "50" (Yes in #110), the attribution code "257" indicating that the typical value difference "0" has continued 50 times is encoded by the code 1, and the result is outputted as the compressed data D2 (#111). Then, the variable n is initialized to "0" (#112).

In the case of "No" in the step #105, i.e., if the block TL does not match the dither pattern DP, the typical value difference "0" is encoded the number of times before that by the code 1 and is outputted (#120). Then, the variable n is initialized to "0" (#121). After that, it is checked whether or not the block TL matches other dither patterns DP (#122). If there is a matching dither pattern DP (Yes in #122), the dither pattern DP is switched to be used (#123). The attribution code "258" indicating that the dither pattern DP has been switched is encoded the number of switching times by the code 1 and is outputted (#124). The typical value "a" is obtained (#225), and the process goes to the step #107.

In the case of "No" in the step #108, i.e., if the typical value difference is not "0" (No in #108), the typical value difference "0" is encoded the number of times before that by the code 1 and is outputted (#126). Then, the variable n is initialized to "0" (#127). After that, the typical value difference is encoded by the code 1 and is outputted (#128), and the process goes back to the step #113.

If the process is not finished yet to the right end of the input band (No in #113), the step #105 and the subsequent steps are repeated so as to perform the process for the right neighboring block TL in turn concerning the same band. When the process for the band is finished (Yes in #113) and there is unprocessed line (No in #114), the next band of the image data is inputted (#104). This process is repeated until all the process for the image data is finished (#114).

In the case of "No" in the step #122, i.e., if there is not matching dither pattern DP, a position data calculating process is performed, which is a characteristic process of the present invention.

More specifically, it is checked whether there is any arrangement pattern before then that matches an arrangement pattern of the image data in the block TL (#131). If there is an arrangement pattern before then (Yes in #131), the attribution code "260" is outputted by the code 1 (#132), and the position data TD indicating the matching position are calculated and are outputted (#133).

If there is no arrangement pattern before then that matches the arrangement pattern of the image data in the block (No in #131), the attribution code "256" indicating that the typical value AP and the position data TD of the block TL could not be calculated is encoded by the code 1 and is outputted (#134). Then, the step #135 and the subsequent steps are performed as the process for the small block TM.

In the process for the small block TM, a signal indicating which small block TM matches with respect to the small blocks TM obtained by the redivision of the block TL is outputted (#135). Then, it is determined whether or not any of the dither patterns DP matches (#136). If it matches (Yes in #136), the typical value difference of the small block TM is encoded by the code 2 and is outputted (#137). If it does not match (No in #136), the arrangement pattern of the image data of the small block TM is obtained as the block data BL (#139). This is repeated until it finishes for the block TL (#138).

In FIGS. 34 and 35, the dither pattern DP and the decode table DC are read (#201 and #202) first. Then, the compressed data D2 transmitted from the computer main body 11 are received, and a process for reconstruction is performed from the head in turn. Initially, the reconstruction is performed by the decode 1 (#203).

If a value dc1 obtained by the reconstruction is not the attribution code "258", "256" or "260" (No in #204-206), it is regarded as a mode 0 (#207). Further, if the value dc1 is not the attribution code "257" (No in #208), the value dc1 is a difference of the typical value "a". Therefore, the typical value "a" is obtained based on this value dc1 (#209). When the typical value "a" is obtained, a value dc1 is added to an accumulated value k1 before then, and the obtained value is regarded as a new accumulated value k1. If the accumulated value k1 exceeds "255", "256" is subtracted from the accumulated value k1 because it exceeds the maximum value of the typical value "a".

Then, the accumulated value k1 is regarded as the typical value "a", and the dot pattern is reconstructed by using the dither pattern DP specified by a pattern number pn (#210). The dot pattern is transmitted to the line buffer (#211), and an area number nb is incremented (#212). Note that the area number nb is a number indicating a position of the block TL to be processed in the band.

Until the expansion process finishes for the same band (No in #213), the step #203 and the subsequent steps are repeated. When the expansion process for the band is finished (Yes in #213), the area number nb is initialized to "0" (#214), and the expanded data for the band (binary image data) are transmitted to the buffer memory for printing (#215). The process is repeated until it finishes for all the compressed data D2 (#216).

In the case of "Yes" in the step #204, i.e., if the value dc1 obtained by the reconstruction process is "258", the pattern number pn is incremented (#221). If the pattern number pn is "3" (Yes in #222), "3" is subtracted from the pattern number pn. Therefore, the pattern number pn is one of values "0", "1" and "2", which can specify one of three types of dither patterns DP. In this way, the check is performed for all the prepared dither patterns DP.

In the case of "Yes" in the step #205, i.e., if the value dc1 is "256", the process goes to the step #271 that is a process for the small block TM. In the step #271, the mode is set to the mode 1 (#271), and the process is performed based on the signal indicating which small block TM matches (#272). The reconstruction process is performed by the decode 2 (#273). If it is indicated that the pattern has matched (Yes in #274), the typical value AP is obtained based on that (#275), and the dot pattern is reconstructed by using the dither pattern DP specified by the pattern number pn (#276).

If it is indicated that the pattern has not matched (No in #274), the reconstruction process is performed by the decode 3 (#278), and the data are outputted as a dot pattern (#279). This process is repeated until the reconstruction is finished for the block TL (#277).

In the case of "Yes" in the step #206, i.e., if the value dc1 is "260", the mode is set to the mode 2 (#281), and the position data TD are obtained (#282), and a dot pattern of the area specified by the position data TD is duplicated to the block TL (#283).

In the case of "Yes" in the step #208, i.e., if the value dc1 is "257", the accumulated value k1 is regarded as the typical value "a", and the dot pattern is reconstructed by using the dither pattern DP specified by the pattern number pn (#231). The dot pattern is transmitted to the line buffer (#232), and the area number nb is incremented (#233). This process is repeated 50 times (#234). Thus, the binary image data of 50 blocks TL are reproduced based on the typical value "a" when the difference "0" has continued 50 times. If the right end of a line appears during this process, the process is stopped temporarily, the step #214 and the subsequent steps are performed, so that the dot pattern is written from the head of the next line newly.

Next, a flow of a general process when the compression process and the expansion process are performed on a line basis will be described with reference to flowcharts.

Figure 36:
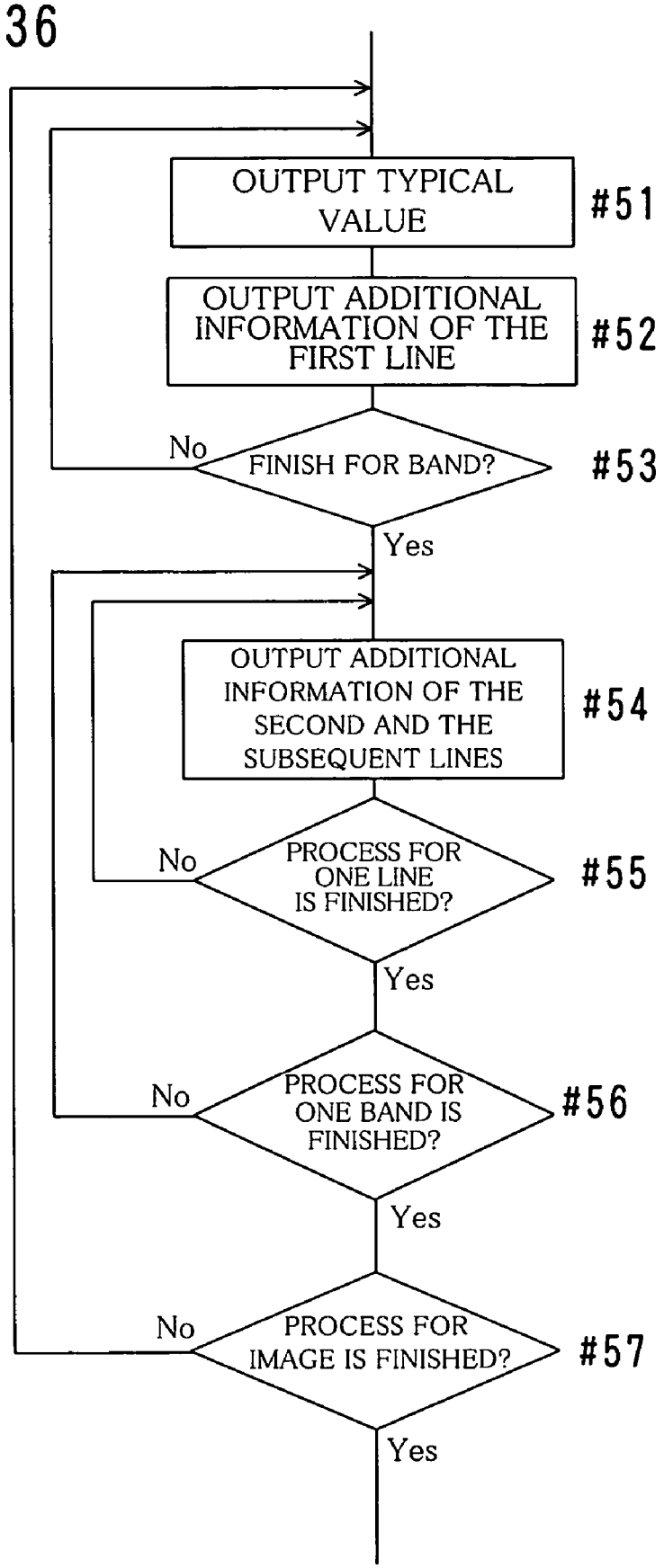
FIG. 36 is a flowchart showing a flow of a process in the case where the compression process is performed on a line basis.
Figure 37:
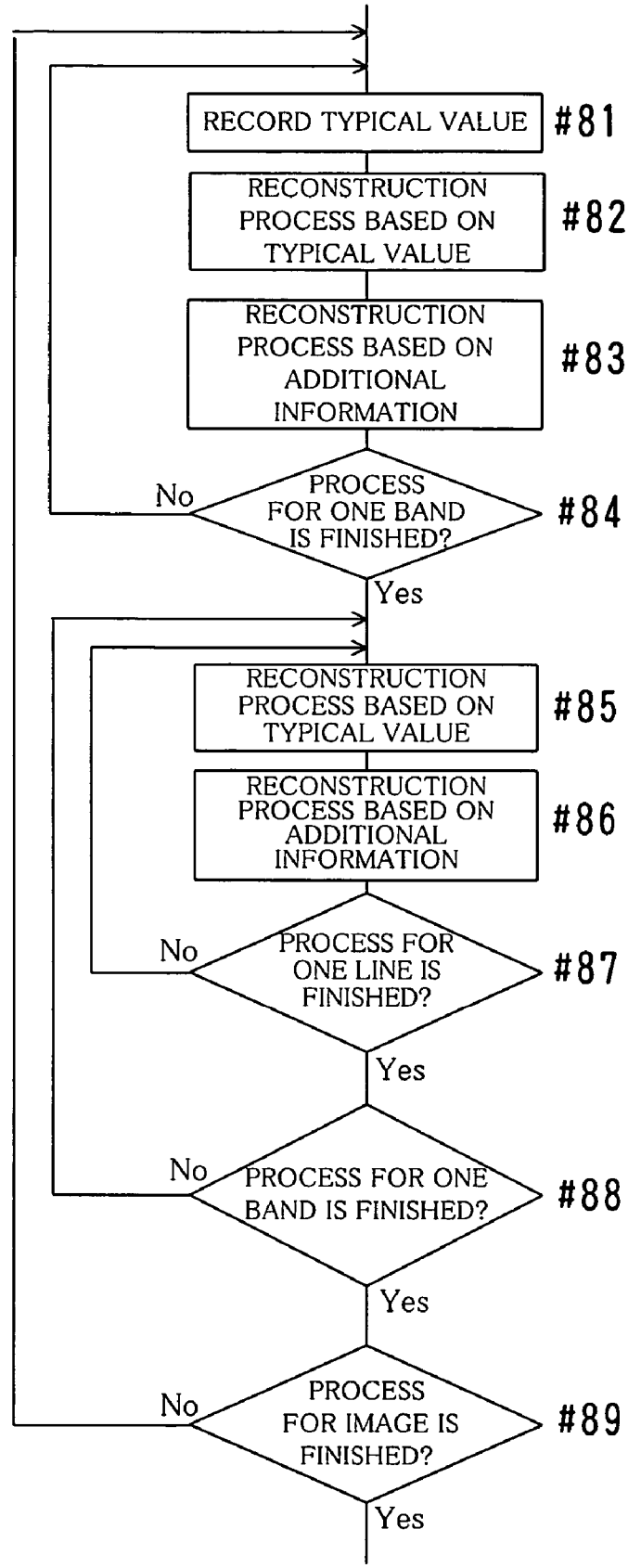
FIG. 37 is a flowchart showing a flow of a process in the case where the expansion process is performed on a line basis.

FIG. 36 is a flowchart showing a flow of a process in the case where the compression process is performed on a line basis, and FIG. 37 is a flowchart showing a flow of a process in the case where the expansion process is performed on a line basis.

In FIG. 36, the additional information FJ of the first line in the band is outputted together with the typical value AP of each block, and after that the additional information FJ of the second and the subsequent lines are outputted.

More specifically, when the typical value AP is determined, the typical value AP is outputted (#51). If there is the additional information FJ of the first line of the block TL that is the same as the typical value AP, it is outputted (#52). This process is repeated, and the typical value AP and the additional information FJ of the first line are outputted for one band (#53).

After that, as to the band BD, the additional information FJ of the second and the subsequent lines is outputted in turn from the head (#54 and #55). When the process is finished for one band (Yes in #56), the steps #51-56 are repeated for the next band BD. When the output is finished for all the image data, the process is finished (#57).

In the expansion process shown in FIG. 37, the received typical values AP are written on the working memory 301 in turn (#81). Then, the reconstruction process based on it and the reconstruction process of the first line based on the additional information FJ are performed (#82-84). Then, the reconstruction process is performed based on the typical value AP written on the working memory 301, and the result is written on the buffer memory 302 (#85). If there is additional information FJ, the reconstruction process is performed based on it so that the result is written on the buffer memory 302 (#86). The steps #85-87 are repeated until the process is finished for one band (#88), and the steps #81-87 are repeated until all the image data are reconstructed.

In the expansion process, since the compressed data D2 received from the computer main body 11 are encoded, the typical value AP and the additional information FJ are obtained by decoding in the printer 13. This process may be performed prior to writing on the working memory 301 and the reconstruction into the buffer memory 302.

Thus, when the compressing process is performed, the binary image data D1 are divided into a dither pattern information component and an image information component. Since the compressed data D2 do not contain the dither pattern information component, a high compression ratio and a high speed process can be realized. In addition, the process for calculating the typical value "a" can be performed fast by reading data out from the upper and lower limit table TJK, so it can contribute to shortening the overall process period.

In this embodiment, it is possible to select one of the typical value AP and the position data TD that has a shorter code length when it is encoded, for generating the compressed data. In addition, it is possible to select one of the typical value AP and the position data TD that is calculated earlier, for generating the compressed data. In addition, it is possible to perform entropy encoding on the typical value AP, the position data TD or the arrangement pattern of the block data BL, for generating the compressed data.

Although the typical value AP about density in each block is used in the embodiment described above, it is possible instead to preset a plurality of patterns (image patterns) PN1, PN2, PN3, . . . having various dot arrangement patterns and to compare each of them with the arrangement pattern of the image data FD of each block TL so as to check whether or not there is a matching pattern PN. If there is a matching pattern PN, the pattern number PNN specifying the matching pattern PN is obtained, and it is regarded as the typical value AP, for example. If there is not a matching pattern PN, it is checked whether or not there is data that match the block TL among the past data in the image data FD as described above. If there is a matching data, the position data TD is obtained.

In addition, when a pattern PN that matches the arrangement pattern of the image data FD in each block TL is searched, if there is no matching pattern PN in the block TL, for example, the pattern PN that matches the small block TM is searched. In addition, if there is no matching pattern PN, an arrangement pattern of the image data in the block TL is selected. In addition, the compressed data are generated by performing the entropy encoding on the pattern PN, the position data TD or the arrangement pattern of the image data of the block TL. In addition, one of the pattern PN and the position data TD that has shorter code length when it is encoded is selected for generating the compressed data. In addition, one of the pattern PN and the position data TD that is calculated earlier is selected for generating the compressed data. In this way, various information about the pattern PN can be selected for generating the compressed data.

The various embodiments described above can be combined in various ways for embodying the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for compressing image data, comprising the steps of:

dividing the image data into predetermined blocks;

calculating a typical value corresponding to a density of image data of a processing target block, which is one of the predetermined blocks, if the image data of the processing target block can be reproduced by using the typical value, wherein the typical value is used as information representing the image data of the processing target block;

checking whether or not there is an arrangement pattern that matches an arrangement pattern of the image data of the processing target block before the processing target block if the image data of the processing target block cannot be reproduced by using the typical value;

calculating position data indicating a matching position if there is the arrangement pattern in the image data before the processing target block that matches the arrangement pattern of the image data of the processing target block, wherein the position data is used as information representing the image data of the processing target block;

obtaining the arrangement pattern of the image data of the processing target block as block data if there is not a matching arrangement pattern in the image data before the processing target block; and creating compressed image data by using the typical value, the position data, or the block data as information representing the image data of each of the predetermined blocks, wherein each of the predetermined blocks is processed sequentially, and wherein each of the foregoing steps is performed by a computer.

2. A method for compressing image data on which a pseudo gradation process has been performed by using a dither pattern, the method comprising the steps of:

dividing the image data into predetermined blocks;

calculating a typical value corresponding to a density of image data of a processing target block, which is one of the predetermined blocks, if an arrangement pattern of the image data of the processing target block can be reproduced by using the dither pattern that was used for the pseudo gradation process and the typical value, wherein the typical value is used as information representing the image data of the processing target block;

checking whether or not there is an arrangement pattern that matches the arrangement pattern of the image data of the processing target block before the processing target block if the image data of the processing target block cannot be reproduced by using the typical value;

calculating position data indicating a matching position if there is the arrangement pattern in the image data before the processing target block that matches the arrangement pattern of the image data of the processing target block, wherein the position data is used as information representing the image data of the processing target block;

obtaining the arrangement pattern of the image data of the processing target block as block data if there is not a matching arrangement pattern in the image data before the processing target block; and creating compressed image data by using the typical value, the position data, or the block data as information representing the image data of each of the predetermined blocks, wherein each of the predetermined blocks is processed sequentially, and wherein each of the foregoing steps is performed by a computer.

3. The method according to claim 2, wherein the step for calculating a typical value includes, for the processing target block, determining a typical value such that the image data in the processing target block is reproduced when density of each pixel in the processing target block is determined by interpolation with a predetermined interpolation rule by using the typical value of the processing target block and typical values of one or more blocks neighboring the processing target block and further a pseudo gradation process on the density is performed by using the dither pattern.

4. The method according to claim 2, wherein the predetermined blocks are obtained by dividing the image data in a line direction and in a subscan direction that is perpendicular to the line direction, the predetermined blocks covering a plurality of lines, and if there is information about density to be replaced with the typical value or to be added to the typical value, the information is determined as additional information for each line in each of the predetermined blocks or for a plurality of lines that is fewer than lines of each of the predetermined blocks, and the additional information is also used for generating the compressed data.

5. The method according to claim 3, wherein the predetermined blocks are obtained by dividing the image data in a line direction and in a subscan direction that is perpendicular to the line direction, the predetermined blocks covering a plurality of lines, and if there is information about density to be replaced with the typical value or to be added to the typical value, the information is determined as additional information for each line in each of the predetermined blocks or for a plurality of lines that is fewer than lines of each of the predetermined blocks, and the additional information is also used for generating the compressed data.

6. A device for compressing image data on which a pseudo gradation process has been performed by using a dither pattern, the device comprising:

a dividing device for dividing the image data into predetermined blocks;

a typical value calculating device for calculating a typical value corresponding to a density of image data of a processing target block, which is one of the predetermined blocks, if an arrangement pattern of the image data of the processing target block can be reproduced by using the dither pattern that was used for the pseudo gradation process and the typical value; and a position data calculating device for calculating position data indicating a matching position if there is an arrangement pattern in the image data before the processing target block that matches the arrangement pattern of the image data in the processing target block, wherein the typical value, the position data or the arrangement pattern of the image data in the processing target block is selected for generating compressed data for each processing target block, and wherein the device processes each of the predetermined blocks sequentially.

7. The device according to claim 6, wherein the typical value calculating device determines, for the processing target block that is one area in the blocks, a typical value such that the image data in the processing target block is reproduced when density of each pixel in the processing target block is determined by interpolation with a predetermined interpolation rule by using the typical value of the processing target block and typical values of one or more blocks neighboring the processing target block and further a pseudo gradation process on the density is performed by using the dither pattern.

8. The device according to claim 6, wherein the predetermined blocks are obtained by dividing the image data in a line direction and in a subscan direction that is perpendicular to the line direction, the predetermined blocks covering a plurality of lines, and if there is information about density to be replaced with the typical value or to be added to the typical value, the information is determined as additional information for each line in each of the predetermined blocks or for a plurality of lines that is fewer than lines of each of the predetermined blocks, and the additional information is also used for generating the compressed data.

9. The device according to claim 6, further comprising a redividing device for redividing the processing target block into small blocks, wherein if a typical value or the position data are not calculated in the processing target block, the typical value or the position data are calculated with respect to the small blocks.

10. The device according to claim 6, wherein if the typical value or the position data are not calculated, an arrangement pattern of the image data in the processing target block is selected.

11. The device according to claim 6, wherein compressed data are generated by performing entropy encoding on the typical value, the position data or the arrangement pattern of the image data in the processing target block.

12. The device according to claim 6, wherein one of the typical value and the position data that has a shorter code length when it is encoded is selected for generating the compressed data.

13. The device according to claim 6, wherein one of the typical value and the position data that is calculated earlier is selected for generating the compressed data.

14. A device for compressing image data on which a pseudo gradation process has been performed by using a dither pattern, the device comprising:
a dividing device for dividing the image data into predetermined blocks;
a searching device for searching a matching pattern by comparing an arrangement pattern of the image data in a processing target block, which is one of the predetermined blocks, with a plurality of predetermined patterns; and
a calculating device for calculating position data of a matching position if there is an arrangement pattern in the image data before the processing target block that matches the arrangement pattern of the image data in the processing target block, wherein
for each processing target block, at least one of the matching pattern, the position data and the arrangement pattern of the image data in the block is selected for generating compressed data, and
wherein the device processes each of the predetermined blocks sequentially.

15. The device according to claim 14, further comprising a redividing device for redividing the processing target block into small blocks, wherein if there is not the matching pattern for the processing target block, the predetermined pattern matching an arrangement pattern of the small blocks is searched.

16. The device according to claim 14, wherein if there is not the matching pattern, the arrangement pattern of the image data in the processing target block is selected for generating compressed data.

17. The device according to claim 14, wherein entropy encoding is performed on the matching pattern, the position data or the arrangement pattern of the image data in the processing target block for generating the compressed data.

18. The device according to claim 14, wherein one of the matching pattern and the position data that has a shorter code length when it is encoded is selected for generating the compressed data.

19. The device according to claim 14, wherein one of the matching pattern and the position data that is calculated earlier is selected for generating the compressed data.

20. A device for compressing image data on which a pseudo gradation process has been performed by using a dither pattern, the device comprising:
a memory;
a processor, said processor being configured to perform the steps of:
dividing the image data into predetermined blocks;
calculating a typical value corresponding to a density of image data of a processing target block, which is one of the predetermined blocks, if an arrangement pattern of the image data of the processing target block can be reproduced by using the dither pattern that was used for the pseudo gradation process and the typical value; and
calculating position data indicating a matching position if there is an arrangement pattern in the image data before the processing target block that matches the arrangement pattern of the image data in the processing target block,
wherein the typical value, the position data or the arrangement pattern of the image data in the processing target block is selected for generating compressed data for each processing target block, and
wherein the processor generates compressed data for each of the predetermined blocks sequentially.

21. A device for compressing image data on which a pseudo gradation process has been performed by using a dither pattern, the device comprising:
a memory;
a processor, said processor being configured to perform the steps of:
dividing the image data into predetermined blocks;
searching a matching pattern by comparing an arrangement pattern of the image data in a processing target block, which is one of the predetermined blocks, with a plurality of predetermined patterns; and
calculating position data of a matching position if there is an arrangement pattern in the image data before the processing target block that matches the arrangement pattern of the image data in the processing target block,
wherein for each processing target block, at least one of the matching pattern, the position data and the arrangement pattern of the image data in the block is selected for generating compressed data, and
wherein the processor generates compressed data for each of the predetermined blocks sequentially.

* * * * *